(12) United States Patent
Rashley et al.

(10) Patent No.: US 12,195,381 B2
(45) Date of Patent: Jan. 14, 2025

(54) COOLING PANEL FOR A MELTER

(71) Applicant: Owens-Brockway Glass Container Inc., Perrysburg, OH (US)

(72) Inventors: Shane T. Rashley, Bowling Green, OH (US); Robert Kuhlman, Dundee, MI (US); David Soley, Swanton, OH (US); Jian Jiao, Perrysburg, OH (US); Walter Anderson, Maumee, OH (US); Susan L. Smith, Rossford, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 17/839,812

(22) Filed: Jun. 14, 2022

(65) Prior Publication Data
US 2022/0306512 A1 Sep. 29, 2022

Related U.S. Application Data

(63) Continuation of application No. 16/590,065, filed on Oct. 1, 2019.

(51) Int. Cl.
*C03B 5/44* (2006.01)
(52) U.S. Cl.
CPC ...................... *C03B 5/44* (2013.01)
(58) Field of Classification Search
CPC ........................................................ F27D 1/12
See application file for complete search history.

(56) References Cited

U.S. PATENT DOCUMENTS

| | | | |
|---|---|---|---|
| 2,448,451 A * | 8/1948 | McKelvey | C03B 5/44 266/190 |
| 4,061,487 A | 12/1977 | Kiyonaga | |
| 4,091,228 A | 5/1978 | Brown, Jr. et al. | |
| 4,121,653 A | 10/1978 | Vinz | |

(Continued)

FOREIGN PATENT DOCUMENTS

| | | | |
|---|---|---|---|
| CN | 104975690 A | 10/2015 | |
| DE | 2825528 | * 6/1978 | F27D 1/12 |

(Continued)

OTHER PUBLICATIONS

N Farmanbar et al. as viewed at https://journals.sagepub.com/doi/10.1177/0954406219850202 (Year: 2019).*

(Continued)

*Primary Examiner* — Jodi C Franklin

(57) ABSTRACT

A cooling panel for a melter is disclosed that includes first and second outer walls and a plurality of side walls coupled to the first and second outer walls. The first and second outer walls and the plurality of side walls define an interior space. Each of the first and second outer walls, moreover, has a plurality of openings. The cooling panel further includes a plurality of baffles disposed in the interior space. The baffles include a plurality of projections. The respective openings of the outer walls and projections of the baffles fit together and are connected from outside of the cooling panel so that the outer walls and the baffles are fixed together, and the side walls are fixed to the outer walls so that the cooling panel is fluid-tight.

20 Claims, 12 Drawing Sheets

(56) References Cited

U.S. PATENT DOCUMENTS

| | | | | |
|---|---|---|---|---|
| 4,528,672 | A | * | 7/1985 | Morgan, II ............... F27D 1/14 373/76 |
| 4,637,034 | A | * | 1/1987 | Grageda ............... F28D 7/0041 373/76 |
| 4,830,651 | A | | 5/1989 | Smith |
| 4,938,456 | A | | 7/1990 | Richards |
| 4,981,112 | A | | 1/1991 | Adams |
| 6,059,028 | A | * | 5/2000 | Kincheloe ................ C21B 7/10 165/169 |
| 6,090,342 | A | * | 7/2000 | Sumigama ............... C21B 7/12 266/193 |
| 6,137,823 | A | | 10/2000 | Johnson et al. |
| 6,563,855 | B1 | * | 5/2003 | Nishi ....................... F27D 1/12 373/76 |
| 8,769,992 | B2 | | 7/2014 | Huber |
| 9,096,453 | B2 | | 8/2015 | Charbonneau |
| 9,145,319 | B2 | | 9/2015 | Mobley et al. |
| 9,468,131 | B2 | * | 10/2016 | Brandt ............... H05K 7/20254 |
| 9,493,372 | B2 | | 11/2016 | Lefrere et al. |
| 9,505,646 | B2 | | 11/2016 | Huber |
| 9,533,905 | B2 | | 1/2017 | Charbonneau et al. |
| 9,776,902 | B2 | | 3/2017 | Mobley et al. |
| 9,643,870 | B2 | | 5/2017 | Huber |
| 9,731,990 | B2 | | 8/2017 | Baker |
| 9,902,639 | B2 | | 2/2018 | Mobley et al. |
| 10,041,666 | B2 | | 8/2018 | Luka et al. |
| 11,390,551 | B2 | | 7/2022 | Rashley et al. |
| 2004/0261395 | A1 | * | 12/2004 | Engdahl .................. F02C 7/143 60/722 |
| 2009/0245319 | A1 | | 10/2009 | Higgins |
| 2011/0236845 | A1 | | 9/2011 | Aoki et al. |
| 2011/0308280 | A1 | * | 12/2011 | Huber ..................... F23D 14/32 65/347 |
| 2012/0077135 | A1 | | 3/2012 | Charbonneau |
| 2012/0193844 | A1 | | 8/2012 | Carraway |
| 2013/0250996 | A1 | * | 9/2013 | Ki ........................... F27B 3/085 373/75 |
| 2014/0190094 | A1 | * | 7/2014 | Gerep ....................... F23M 5/00 52/173.1 |
| 2015/0336834 | A1 | | 11/2015 | Mobley et al. |
| 2016/0002084 | A1 | | 1/2016 | Charbonneau |
| 2016/0075586 | A1 | | 3/2016 | Charbonneau et al. |
| 2016/0075587 | A1 | | 3/2016 | Baker |
| 2016/0083279 | A1 | | 3/2016 | Cai et al. |
| 2016/0107914 | A1 | | 4/2016 | Baker et al. |
| 2017/0008086 | A1 | | 1/2017 | Jones |
| 2017/0059153 | A1 | | 3/2017 | Baker et al. |
| 2017/0059154 | A1 | | 3/2017 | Luka et al. |
| 2018/0057387 | A1 | * | 3/2018 | Faulkinbury ............ C03B 5/44 |
| 2018/0058770 | A1 | | 3/2018 | Adrian et al. |
| 2018/0065877 | A1 | * | 3/2018 | Faulkinbury ............ C03B 5/44 |
| 2018/0111866 | A1 | | 4/2018 | Macphee et al. |
| 2018/0141127 | A1 | | 5/2018 | Richard |
| 2018/0149429 | A1 | | 5/2018 | Smith et al. |
| 2021/0009457 | A1 | * | 1/2021 | Rashley ............... C03B 5/2356 |
| 2021/0094863 | A1 | | 4/2021 | Rashley et al. |
| 2022/0388886 | A1 | * | 12/2022 | Rashley ................ F27D 1/0006 |

FOREIGN PATENT DOCUMENTS

| | | | | |
|---|---|---|---|---|
| DE | 2825528 | A1 | | 12/1979 |
| EP | 0496714 | A1 | | 7/1992 |
| EP | 1216965 | A2 | | 6/2002 |
| EP | 2685170 | A1 | | 1/2014 |
| JP | 2007278669 | A | * | 10/2007 |
| WO | 2009096729 | A2 | | 8/2009 |
| WO | 2010052220 | A1 | | 5/2010 |
| WO | 2013188167 | A1 | | 12/2013 |
| WO | WO-2014008575 | A1 | * | 1/2014 ............ F27D 1/12 |
| WO | 2021067227 | A1 | | 4/2021 |

OTHER PUBLICATIONS

Projection Welding is the Boss of Embossments as viewed at https://www.imts-exhibition.com/blog/projection-welding-is-the-boss-of-embossments.html (Year: 2020).*

Beginner welding as viewed at beginnerwelding.com/what-is-a-plug-weld.com (Year: 2020).*

Brown How to design Assemblies to be self-locating and self-fixturing 2017 different metal machining and welding (Year: 2017).*

PCT Int. Search Report and Written Opinion, Int. Application No. PCT/US2020/053204, Int. Filing Date: Sep. 29, 2020, Applicant Owens-Brockway Glass Container Inc., Mail Date: Feb. 1, 2021.

Chilean Informe Pericial (Expert Report), Serial No. 202103113, Applicant: Owens-Brockway Glass Container Inc., Dated: Mar. 14, 2023.

Chilean Informe de Busqueda (Search Report), Serial No. 202103113, Applicant: Owens-Borckway Glass Container Inc., Dated: Mar. 14, 2023.

Chilean Informe de Buqueda (Search Report), Serial No. 202103113, Applicant: Owens-Brockway Glass Container Inc., Dated: May 15, 2023.

Chilean Respuesta Pericial (Expert Response), Serial No. 202103113, Applicant: Owens-Brockway Glass Container Inc., Dated: May 15, 2023.

Indonesian Office Action with English Translation, Application No. P00202203867, Applicant: Owens-Brockway Glass Container Inc., Mailed: Oct. 19, 2023.

Sandeep Kumar, "Corner Joint Welding—The Basics You Need to Know", Last Updated on Oct. 6, 2023.

Wikipedia Definition: Friction stir spot welding, https://en.wikipedia.org/w/index.php?title=Friction_sitr_spot_welding&oldid=1147005112.

Canadian Office Action, Application No. 3,144,763, Applicant: Owens-Brockway Glass Container Inc., Dated: Mar. 14, 2024.

CL2022003657A1 Bibliographic Data, Espacenet Website, https://worldwide.espacenet.com/publicationDetails/biblio?II=0&ND=3&adjacent=true&locale=en_EP&FT=D&date=20230630&CC=CL&NR=2022003657A1&KC=A1.

CL2022003658A1Bibliographic Data, Espacenet Website, https://worldwide.espacenet.com/publicationDetails/biblio?II=0&ND=3&adjacent=true&locale=en_EP&FT=D&date=20230721&CC=CL&NR=2022003658A1&KC=A1.

* cited by examiner

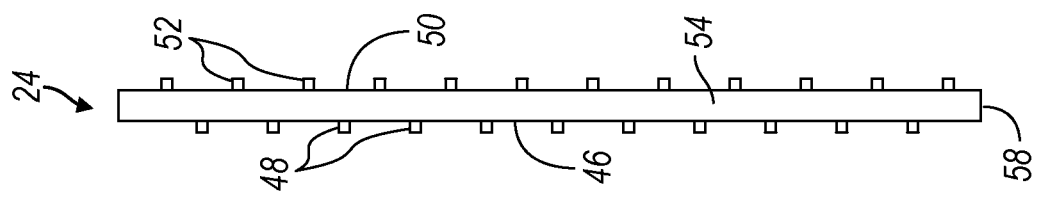
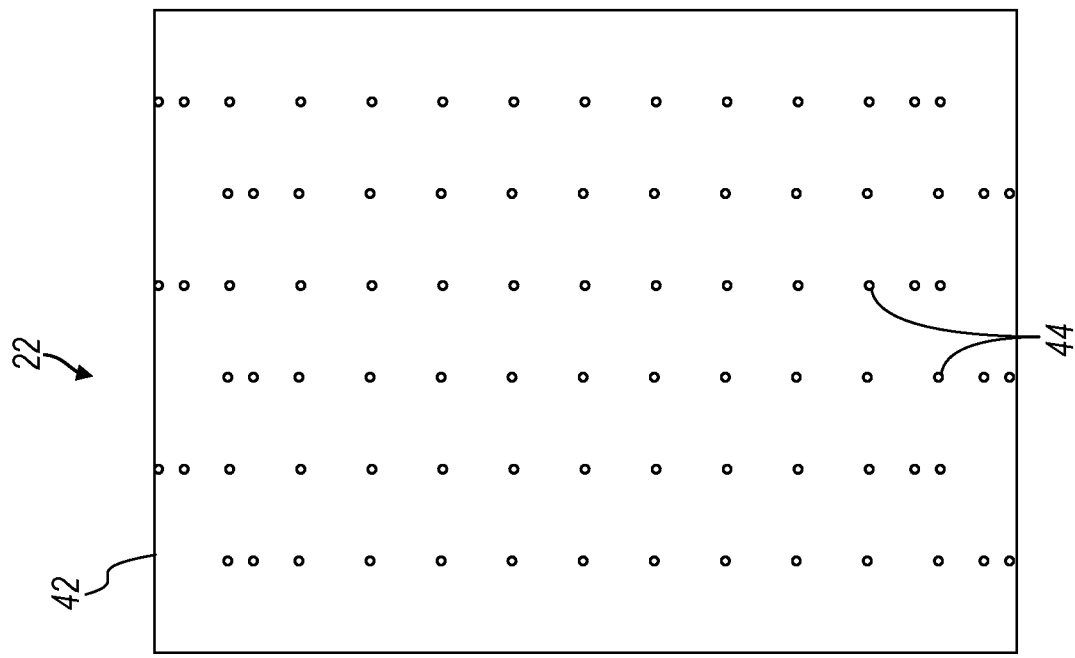
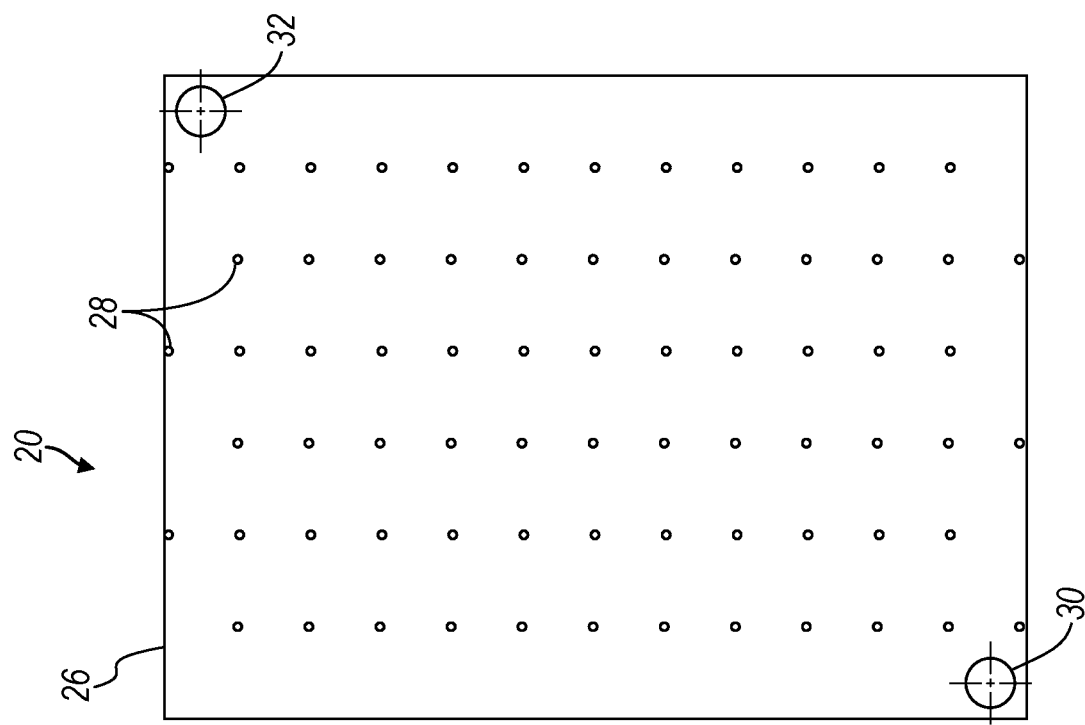

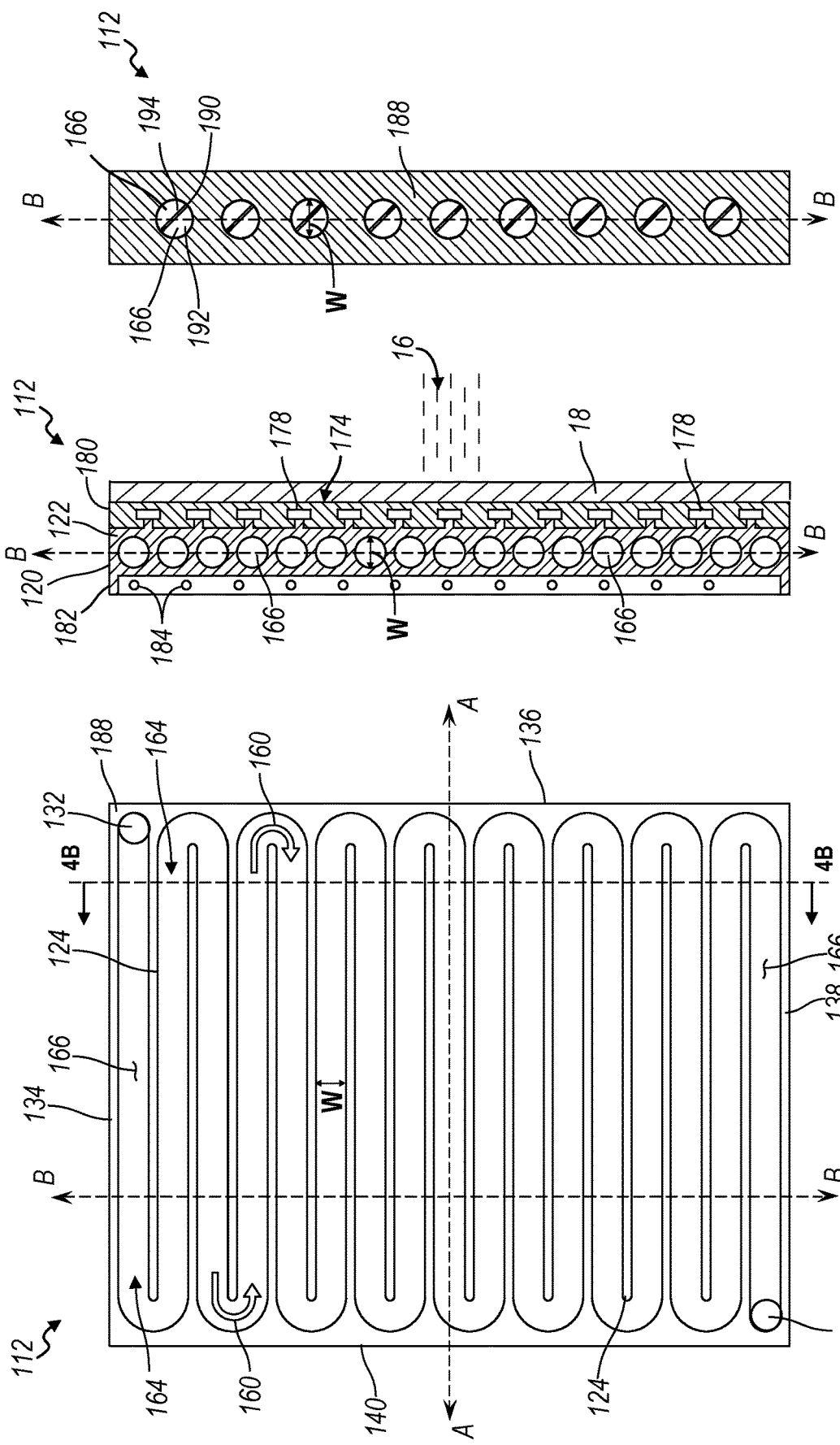

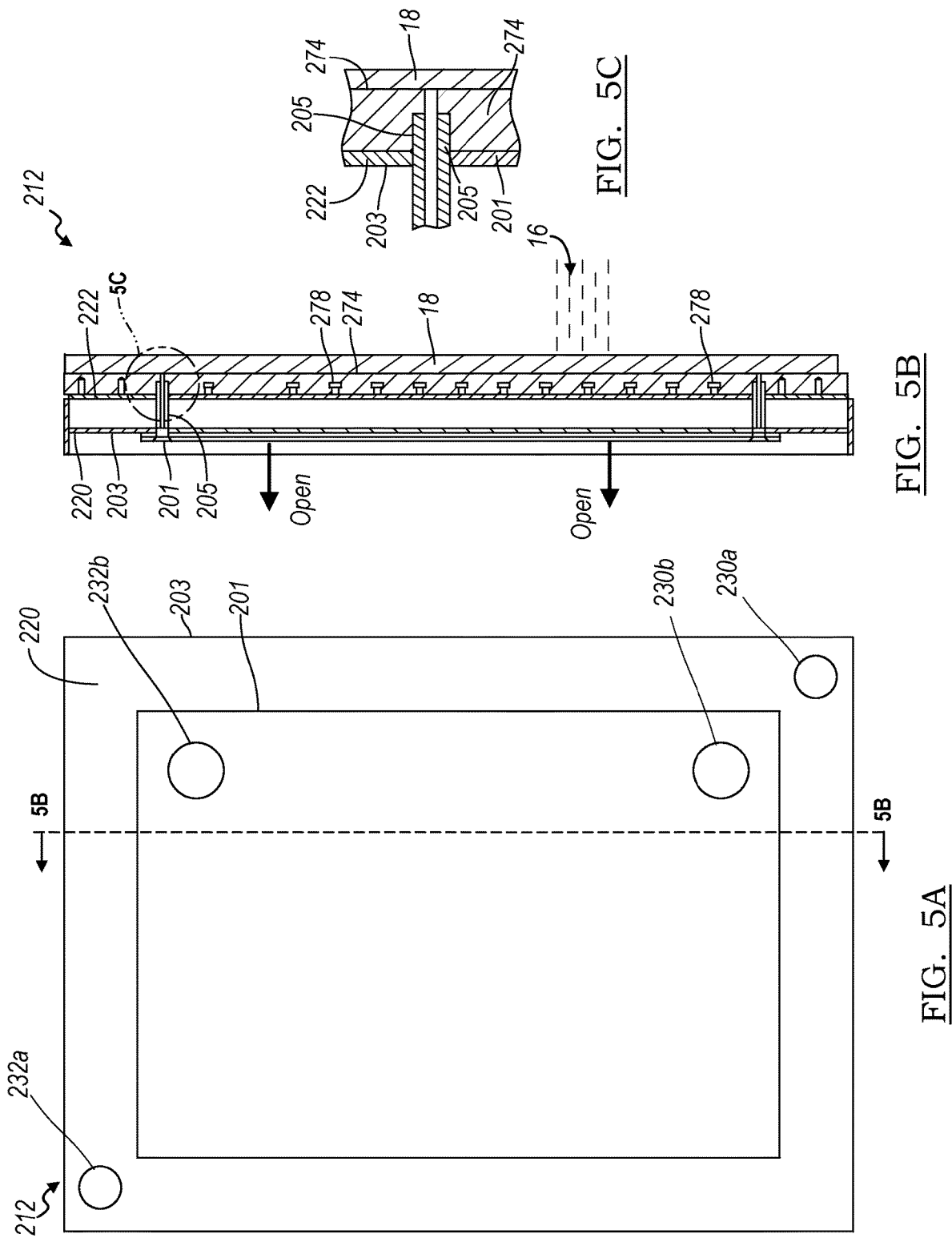

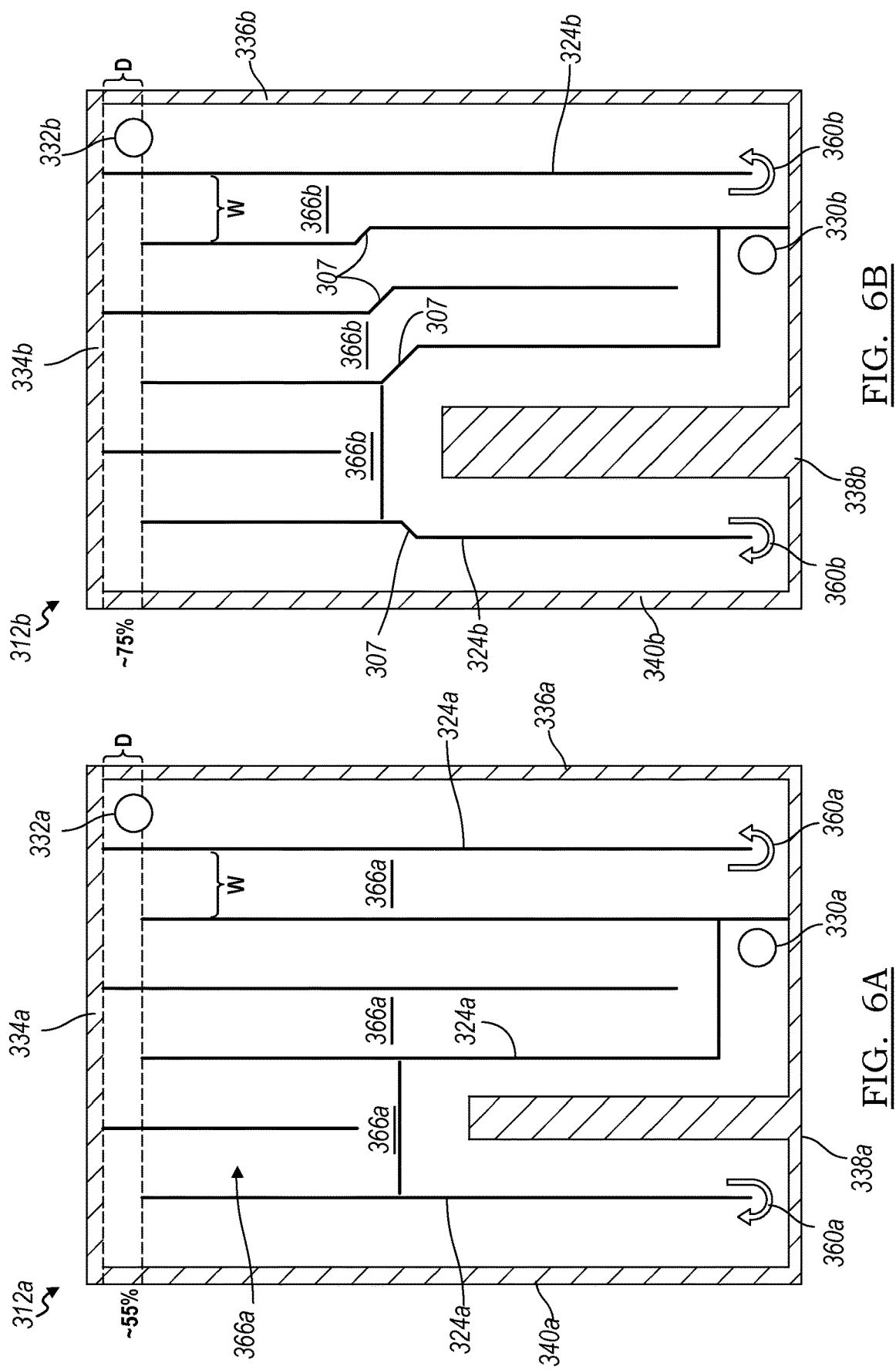

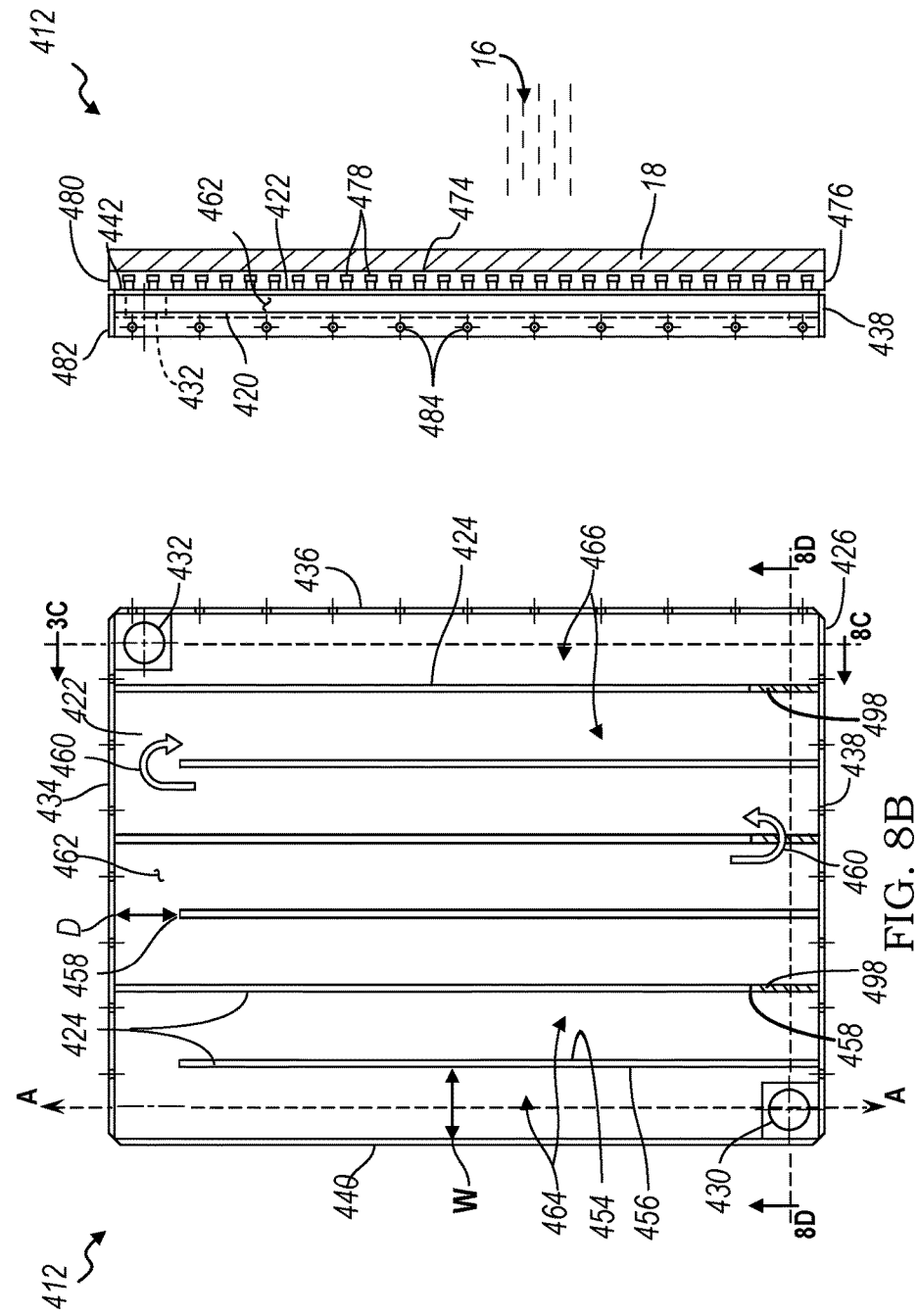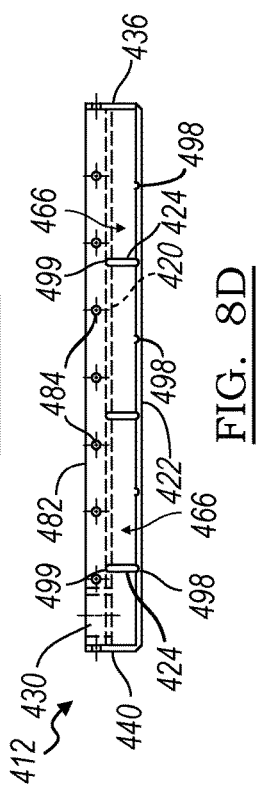

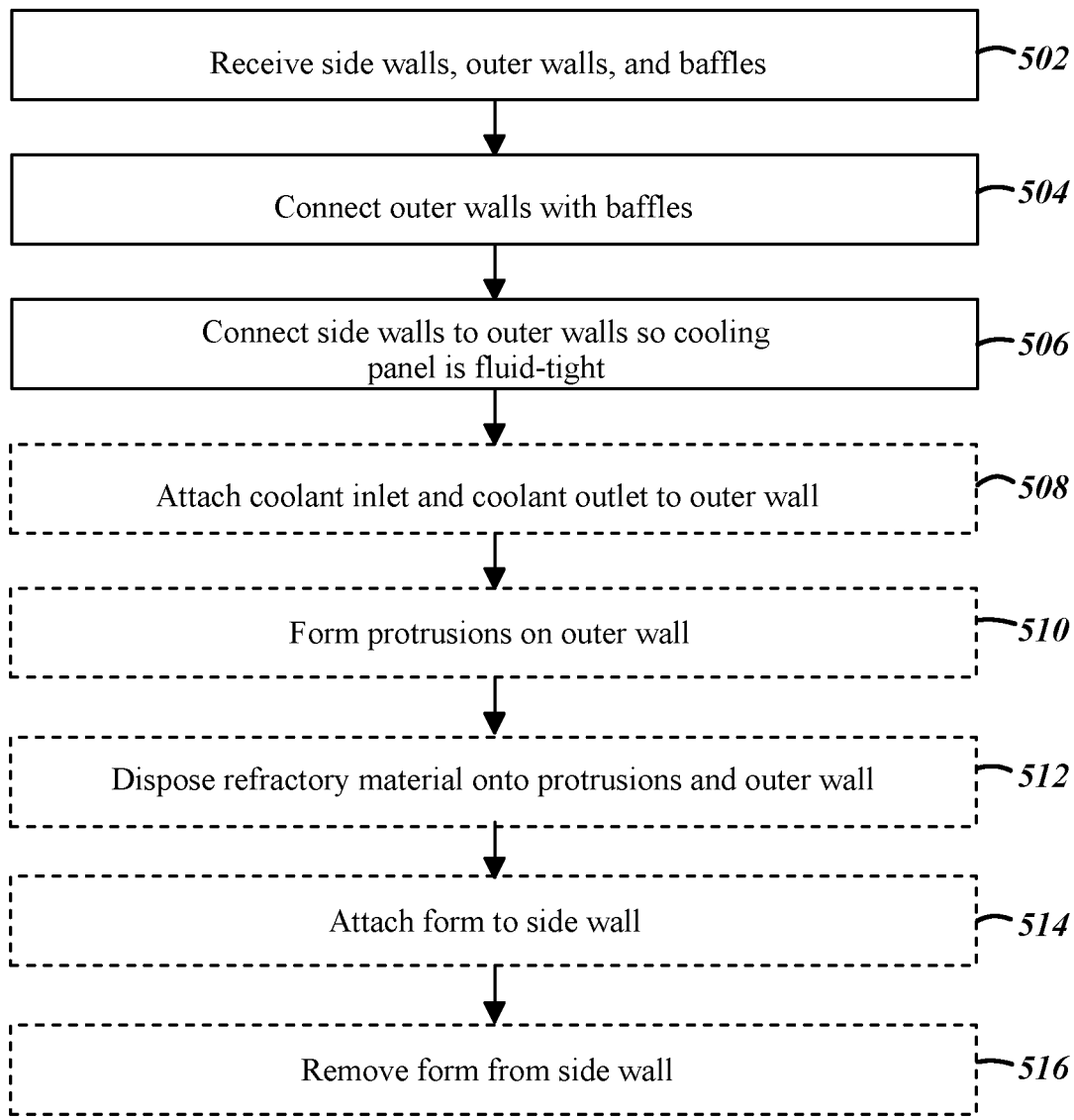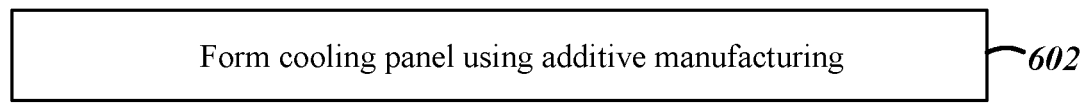

COOLING PANEL FOR A MELTER

This patent application discloses devices and methods for use in glass manufacturing, and more particularly, devices to provide fluid cooling for a glass melter.

BACKGROUND

Glass manufacturing often occurs at high temperatures that require the equipment used in the glass manufacturing process to withstand harsh conditions. In particular, submerged combustion melting ("SCM") is a specific type of glass manufacturing, in which an air-fuel or oxygen-fuel mixture is injected directly into a pool of molten glass. As combustion gases forcefully bubble through the molten glass, they create a high-heat transfer rate and turbulent mixing of the molten glass until it achieves a uniform composition. A typical submerged combustion melter has a floor and a vertical burner passage extending through the floor. A burner positioned within the burner passage is submerged in the molten glass.

In order to withstand the harsh conditions within the melter for traditional glass manufacturing or SCM, part or all of the melter's floor, walls, or roof can be fluid-cooled. A portion of the melter's floor, walls, or roof that contacts the molten glass can include a refractory material in order to withstand the high temperatures. Another portion of the melter's floor, walls, or roof can include the fluid-cooling.

BRIEF SUMMARY OF THE DISCLOSURE

The present disclosure embodies a number of aspects that can be implemented separately from or in combination with each other.

In accordance with one aspect of the disclosure, there is a cooling panel for a melter that includes first and second outer walls and a plurality of side walls coupled to the first and second outer walls, defining an interior space, and a plurality of baffles disposed in the interior space, where each baffle includes a plurality of projections. Each of the first and second outer walls has a plurality of openings. Respective openings and projections fit together and are connected from outside of the cooling panel so that the outer walls and the baffles are fixed together, and the side walls are fixed to the outer walls so that the cooling panel is fluid-tight.

In accordance with another aspect of the disclosure, there is provided a cooling panel for a melter that has first and second outer walls and a plurality of side walls, defining an interior space, and a plurality of baffles disposed in the interior space and dividing the interior space into a plurality of rows wherein each row has a width W. Each baffle has first and second longitudinal surfaces and an open transverse surface. Each open transverse surface of each baffle is spaced away from an adjacent side wall by a distance D that is 70% to 80% of the width W of each row.

In accordance with another aspect of the disclosure, there is provided a method of forming a cooling panel having some or all of the features discussed herein. The method includes receiving a plurality of side walls, first and second outer walls each having a plurality of openings, and a plurality of baffles each having a plurality of projections; connecting the first and second walls with the plurality of baffles disposed between the outer walls; and connecting the side walls to the first and second outer walls to fix the sides walls to the outer walls and so that the cooling panel is fluid-tight.

In accordance with one aspect of the disclosure, there is a cooling panel for a melter that includes first and second outer walls and a plurality of side walls coupled to the first and second outer walls, defining an interior space, where the first outer wall includes a plurality of inwardly-facing first grooves, and the second outer wall includes a plurality of inwardly-facing second grooves parallel with the first grooves; and a plurality of baffles disposed in the interior space and carried by the first grooves and the second grooves; wherein a first set of the first grooves and the second grooves extends a length of the cooling panel, and a second set of the first grooves and the second grooves partially extends the length of the cooling panel, and wherein the first set and the second set alternate to create a serpentine fluid flow path in the interior space.

BRIEF DESCRIPTION OF THE DRAWINGS

The disclosure, together with additional objects, features, advantages and aspects thereof, will be best understood from the following description, the appended claims and the accompanying drawings, in which:

FIG. 2A is a side view of a first outer wall of the cooling panel included in the melter shown in FIGS. 1A and 1B, in accordance with an illustrative aspect of the present disclosure;

FIG. 2B is a side view of a second outer wall of the cooling panel included in the melter shown in FIGS. 1A and 1B, in accordance with an illustrative aspect of the present disclosure;

FIG. 2C is a side view of a baffle of the cooling panel included in the melter shown in FIGS. 1A and 1B, in accordance with an illustrative aspect of the present disclosure;

FIG. 4A is a cross-sectional front view of an embodiment of the cooling panel included in the melter shown in FIGS. 1A and 1B, where the cooling panel is fabricated using additive manufacturing, in accordance with an illustrative aspect of the present disclosure;

FIG. 4B is a cross-sectional side view of the cooling panel shown in FIG. 4A illustrating refractory material disposed on one outer wall and a frozen glass layer disposed on the refractory material, in accordance with an illustrative aspect of the present disclosure;

FIG. 4C is a cross-sectional side view of the cooling panel shown in FIGS. 4A and 4B, where fluid passages in the cooling panel include internal features, in accordance with an illustrative aspect of the present disclosure;

FIG. 5A is a front view of an embodiment of the cooling panel included in the melter shown in FIGS. 1A and 1B, where the cooling panel includes a door and frame with at least one wall extension for protecting the refractory material, in accordance with an illustrative aspect of the present disclosure;

FIG. 5B is a cross-sectional side view of the cooling panel shown in FIG. 5A, illustrating the door and frame with a wall extension, refractory material disposed on one outer wall, and a frozen glass layer disposed on the refractory material, in accordance with an illustrative aspect of the present disclosure;

FIG. 5C is an enlarged fragmentary cross-sectional view of the wall extensions shown in FIG. 5B, in accordance with an illustrative aspect of the present disclosure;

FIG. 6A is a cross-sectional front view of the cooling panel included in the melter shown in FIGS. 1A and 1B, illustrating one embodiment of baffles and fluid passages within the cooling panel, where the distance D is 55% of the width W, in accordance with an illustrative aspect of the present disclosure;

FIG. 6B is a cross-sectional front view of the cooling panel included in the melter shown in FIGS. 1A and 1B, illustrating one embodiment of baffles and fluid passages within the cooling panel, where the distance D is 75% of the width W, in accordance with an illustrative aspect of the present disclosure;

FIG. 8B is a front view of the cooling panel shown in FIG. 8A, illustrated with baffles and with one outer wall removed, in accordance with an illustrative aspect of the present disclosure;

FIG. 8C is a cross-sectional side view of the cooling panel shown in FIGS. 8A and 8B, showing refractory material disposed on one outer wall and a frozen glass layer disposed on the refractory material, in accordance with an illustrative aspect of the present disclosure;

FIG. 8D is a cross-sectional top view of the cooling panel shown in FIGS. 8A through 8C, showing multiple baffles in the interior space of the cooling panel, in accordance with an illustrative aspect of the present disclosure;

FIG. 9 is a flow diagram showing various steps of an illustrative embodiment of a method for fabricating a cooling panel as shown in FIGS. 1A through 3D and 8D; and FIG. 10 is a flow diagram showing various steps of an illustrative embodiment of a method for additively manufacturing a cooling panel as shown in FIGS. 4A through 4C.

DETAILED DESCRIPTION

Figure 1A:
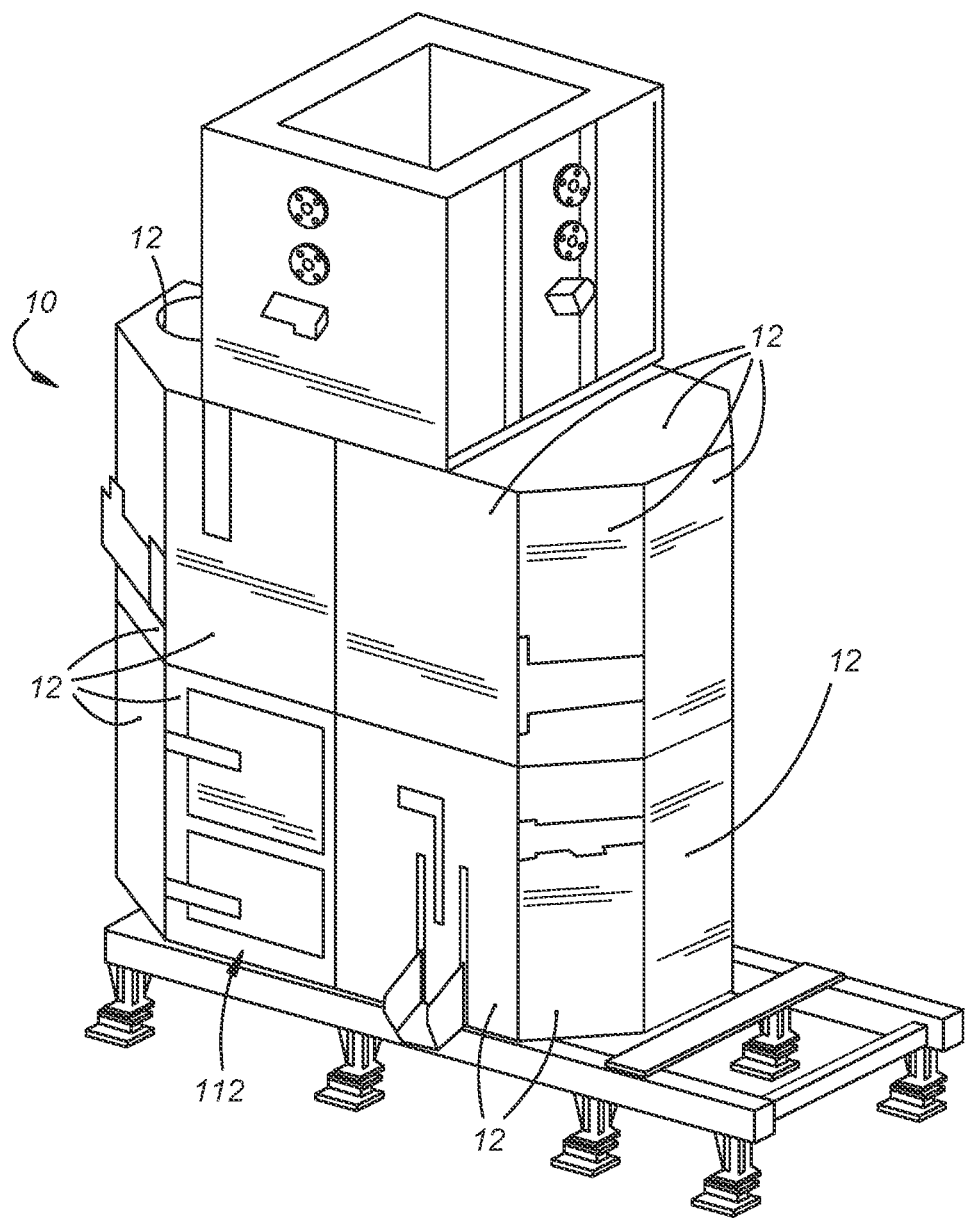
FIG. 1A is an isometric view of a melter having at least one cooling panel, in accordance with an exemplary embodiment of the present disclosure.

In accordance with at least one aspect of the disclosure, a cooling panel for a glass melter is provided that is better able to withstand the harsh conditions of the melter than prior cooling panels.

As briefly described in the background, harsh environments within a melter for glass manufacturing, particularly in SCM, can lead to wear, cracking, erosion, and/or failure of the melter's floor, walls, or roof. The melter's floor, walls, or roof can be constructed of panels that include a steel portion and a refractory material portion coupled to the steel portion, where the refractory portion contacts a molten material within the melter. Temperatures in the melter can be between approximately 1300-1500 degrees Celsius (° C.) or higher. The refractory material portion can better withstand the high temperatures within the melter and may have a thickness in the range of 0.1-3.0 inches, including all ranges, subranges, and values therebetween. However, due to the harsh conditions, the panels and even the refractory material can be susceptible to wear, cracking, erosion, and/or failure because of its direct contact with the molten material (e.g., molten glass).

Accordingly, a melter having at least one cooling panel is disclosed. Each cooling panel requires less time than conventionally fabricated panels to position internal baffles, assemble and weld each panel, and reduces the likelihood of error. Projections on each baffle fit into corresponding openings in outside walls and can be welded using plug welds. No fillet welds are required inside the cooling panels because each baffle can be welded from the outside using plug welds. Each outside wall, side wall, and baffle can be laser cut with the required openings and projections and require no layout time.

Additionally, each cooling panel can include fluid flow paths that can be configured to reduce stagnant areas of fluid flow and minimize surface hot spots on the hot side of each cooling panel. The fluid flow paths can also be configured to reduce pressure drop of the coolant. Each cooling panel can include an inlet at the bottom and an outlet at the top, which reduces risk of developing an air pocket in the top of the panel. Moreover, each cooling panel can be configured to be the same size and/or interchangeable, which also allows different configurable locations for an access door and/or melter exits.

Further, each cooling panel may be fabricated as a single monolithic part, which can improve conduction heat transfer. When fabricated as a single monolithic part, each cooling panel can include flow passages with fluid flow paths optimized for convective heat transfer and for minimizing pressure drop through the cooling panel. The flow passages can be configured to withstand higher pressure than conventional panels, which allows the use of cooling fluids other than water. Also, the flow passages may include internal features that can be configured to enhance heat transfer, which can be done by changing the cross-sectional area of the flow path and/or by changing centerline distance between each flow passage.

Figure 1B:
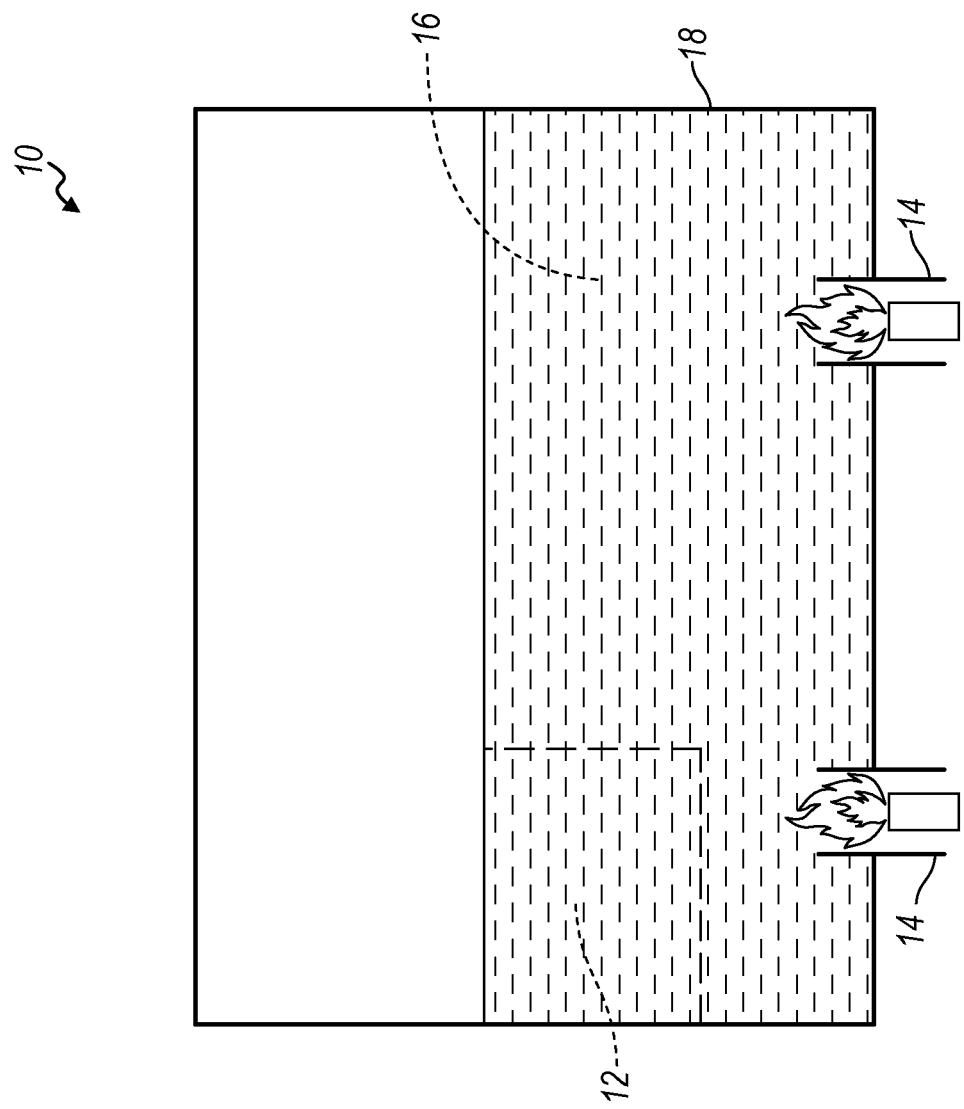
FIG. 1B is a cross-sectional view of the melter illustrated in FIG. 1A, in accordance with an illustrative aspect of the present disclosure.

FIGS. 1A and 1B depict a melter 10 comprised of multiple cooling panels 12 and submerged burners 14 (FIG. 1B), the melter 10 configured for melting and containing molten material 16 (FIG. 1B). The melter 10 can include, for example, a glass melter (e.g., a submerged combustion melter) or melter for other material. The molten material 16 in the melter 10 can typically exist in a liquid or semi-liquid state; however, a portion of the molten material 16 that flows closer to the floors, walls, or roof of the melter 10 can become a solid (or at least a very viscous state) because of its lower temperature, due to a cooling effect from the floors, walls, or roof, than the first portion of the molten material 16. The solidified material (which can be glass) can comprise a solid or frozen material layer 18 that can be coupled to the floors, walls and roof (e.g., at least one cooling panel 12).

The melter 10 can comprise at least one cooling panel 12 configured to both provide structure to the melter and to cool a portion of the molten material 16 and form the frozen material layer 18 coupled to each cooling panel 12. In a specific embodiment, the floor, the walls, and the roof of the melter 10 can include interchangeable cooling panels, as depicted in FIG. 1A. It is contemplated that the melter 10 may be comprised entirely of multiple cooling panels 12 or may comprise only one or several cooling panels 12.

Figure 3A:
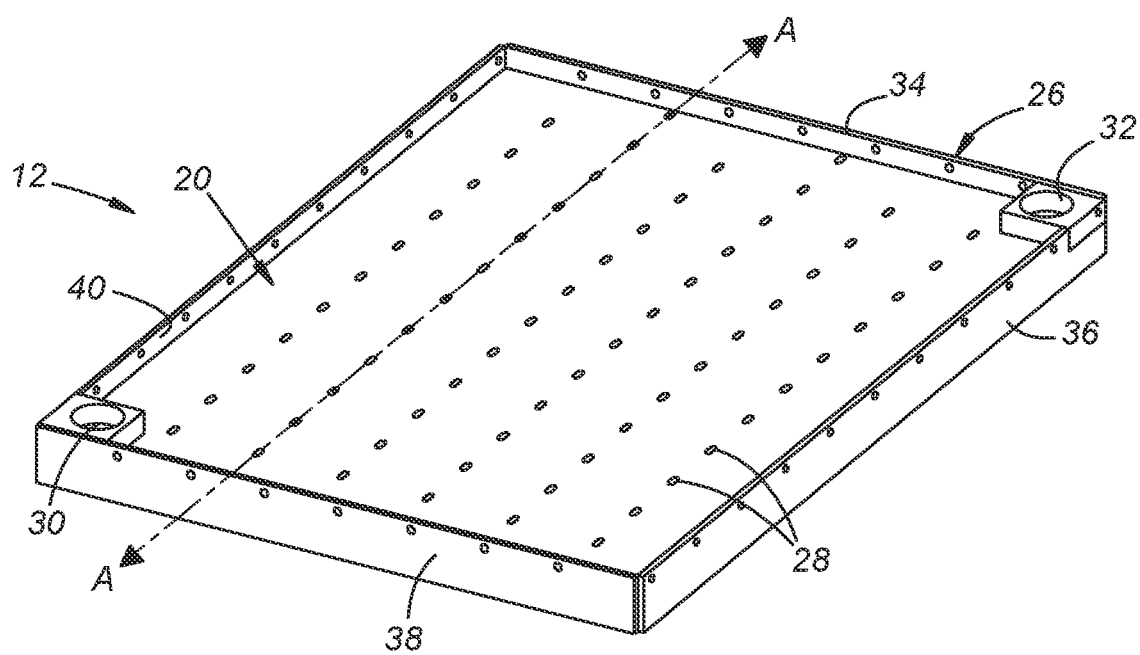
FIG. 3A is an isometric view of the cooling panel included in the melter shown in FIGS. 1A and 1B, illustrated without baffles and with one outer wall removed, in accordance with an illustrative aspect of the present disclosure.

As illustrated in FIGS. 2A through 2C, each cooling panel 12 can include a first outer wall 20, a second outer wall 22, and at least one baffle 24. FIG. 2A illustrates the first outer wall 20, which includes a perimeter 26 and a plurality of first openings 28. The first outer wall 20 is also depicted as including a coolant inlet 30 and a coolant outlet 32, although it will be appreciated that the second outer wall 22 may instead include the coolant inlet 30 and the coolant outlet 32. A plurality of side walls 34, 36, 38, 40 can be configured to be coupled (e.g., welded) to the first outer wall 20 around and/or proximate to the perimeter 26 as shown in FIG. 3A. FIG. 2B illustrates the second outer wall 22 having a perimeter 42 and a plurality of second openings 44. The side walls 34, 36, 38, 40 can also be configured to be coupled (e.g., welded) to the second outer wall 22 around and/or proximate to the perimeter 42.

The first openings 28 and the second openings 44 are depicted as holes or slots, although other configurations may be included. Even though the first openings 28 and the second openings 44 are depicted as having a circular cross-section or as slots, they could also be configured with a variety of cross-sections and/or shapes, including oval, rectangular, square, triangular, other types of polygons, or the like.

As illustrated in FIG. 2C, each cooling panel 12 can include at least one baffle 24. Each baffle 24 can have a first side 46 with respective first projections 48 and an opposing second side 50 with respective second projections 52. In the embodiment shown in FIG. 2C, the first and second projections 48, 52 are depicted as tabs extending from both the first and second sides 46, 50 of the baffle 24, although the first and second projections 48, 52 may be configured in other ways. As depicted, the first projections 48 extend from the first side 46 of the baffle 24 and are configured to fit in respective first openings 28 of the first outer wall 20, and the second projections 52 extend from the second side 50 of the baffle 24 and are configured to fit in respective second openings 44 of the second outer wall 22. It will be appreciated that the projections 48, 52 could comprise other configurations, for example posts, studs, screws, rivets, slugs, bolts, welds, welded pieces, or the like.

The openings 28, 44 and the projections 48, 52 can be configured to fit together (e.g., a loose fit, an interference fit, and so forth) and connect from outside of the cooling panel 12, requiring no welds (e.g., fillet welds) within the cooling panel 12. In this way, the first and second outer walls 20, 22 and the baffles 24 can be fixed (e.g., coupled) together, and the side walls 34, 36, 38, 40 can be fixed to the first and second outer walls 20, 22 so that the cooling panel 12 is fluid-tight.

Additionally, each baffle 24 can comprise a pair of longitudinal surfaces including a first longitudinal surface 54 and an opposing second longitudinal surface 56. Each baffle 24 can also include an open transverse surface 58 configured to not be coupled to anything else (e.g., exposed to coolant). While the open transverse surface 58 in FIG. 2C is shown at the bottom of the baffle 24, it will be appreciated that the open transverse surface 58 could also be located at the top of the baffle 24.

In the cooling panel 12, the first and second outer walls 20, 22, the side walls 34, 36, 38, 40, and the baffles 24 can define an interior space 62 in which the coolant can flow through a serpentine fluid flow path 60. The baffles 24 function to divide the interior space 62 into a plurality of rows (e.g., row 64), where each row can be parallel with a longitudinal axis A and can have a width W. The width W can be between baffles 24 or between one baffle 24 and an adjacent side wall 34, 36, 38, 40. In order to provide a uniform width W for each row 64, the width W between baffles 24 may be the same as the width W between the one baffle 24 and the adjacent side wall 36, 40.

FIGS. 3A-3D illustrate an embodiment of a cooling panel 12 showing one outer wall (e.g., first outer wall 20) including side walls 34, 36, 38, 40 coupled to the outer wall around a perimeter (e.g., perimeter 26) of the outer wall. The plurality of side walls 34, 36, 38, 40, along with the first outer wall 20 and the second outer wall 22, can define an interior space 62 with fluid passages 66 through which a coolant can flow. The fluid passages 66 can be aligned and/or correspond with a respective row 64. FIG. 3A illustrates one arrangement of the openings 28 in the first outer wall 20, where the openings 28 are arranged parallel to longitudinal axis A and configured to be coupled with respective projections 48, 52 of each baffle 24. The second outer wall 22 and the baffles 24 are shown removed in FIG. 3A.

Figure 3B:
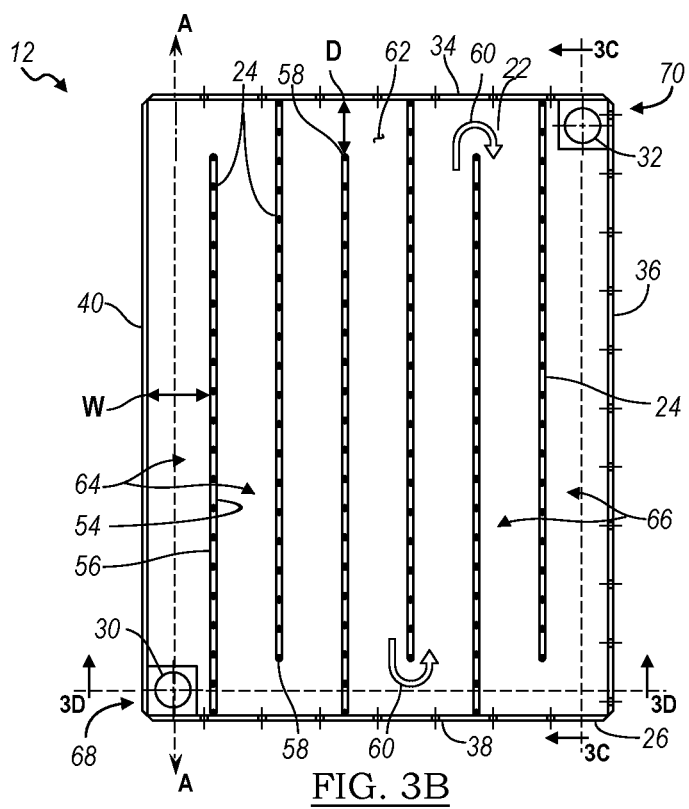
FIG. 3B is a front view of the cooling panel shown in FIG. 3A, illustrated with baffles and with one outer wall removed, in accordance with an illustrative aspect of the present disclosure.

FIG. 3B illustrates a plurality of baffles 24 coupled to the second outer wall 22, where the first projections 48 are coupled with respective first openings 28. The second outer wall 22, and the side walls 34, 36, 38, 40 define a plurality of fluid passages 66 when the first outer wall 20 (not shown in FIG. 3B) is also coupled to the baffles 24 and the side walls 34, 36, 38, 40. It will be appreciated that the outer wall shown in FIGS. 3A through 3D may be either the first outer wall 20 and/or the second outer wall 22. Additionally, the first outer wall 20 is shown removed in FIG. 3B.

In manufacturing and/or construction of the cooling panel 12, the cooling panel 12 can be formed so that the first and second openings 28, 44 and the projections 48, 52 fit together, respectively, in order to secure the first and second outer walls 20, 22 to the baffles 24. In an example, the first and second openings 28, 44 and the projections 48, 52 can be held together by clamps until welds have been made and connected together from outside of the cooling panel 12 so that no interior welds are necessary within the cooling panel 12. Once a baffle 24 has been coupled to an outer wall, the other of the first and second outer walls 20, 22 can include one or more holes that matches the location of the baffles 24, and the other of the first and second outer walls 20, 22 can be placed on top of the baffles 24 for welding, for example plug welding or a weld at the holes, to couple to the baffles 24. The plug welding would occur from outside of the cooling panel 12. Subsequently, the side walls 34, 36, 38, 40 can be welded, for example fillet welded or welded along a joint between two parts at an angle to each other, to the first and second outer walls 20, 22 to form a fluid-tight cooling panel 12.

With conventional technology, a cooling panel would typically be constructed such that baffles were welded, for example stitch welded or intermittently welded, along a joint between a respective baffle and one of the first and second outer walls from within the interior space. These internal welds have been necessary to hold the baffles in place prior to attaching the first and/or second outer walls.

With the disclosed first and second openings 28, 44 and projections 48, 52, the first and second outer walls 20, 22 and the baffles 24 can be fitted together without needing to internally weld either of the first and second outer walls to the baffles 24 before also fitting the other of the first and second outer walls 20, 22 to the baffles 24. This can save time and cost in construction. This construction also can reduce the chance for any errors in positioning the first and second outer walls 20, 22 and the baffles 24 together. All welds can be made from outside the cooling panel 12 such that a liquid-tight joint results. Additionally, the first and second outer walls 20, 22 and the baffles 24 can be more easily cut, including being laser-cut, to the correct geometries.

FIGS. 3A through 3D also show the coolant inlet 30 and the coolant outlet 32 for passing a coolant into and from the cooling panel 12. In one aspect, the coolant inlet 30 can be located at the bottom portion 68 of the cooling panel 12 and the coolant outlet 32 can be located at a top portion 70 of the cooling panel 12. More specifically, the coolant inlet and outlet 30, 32 may both be formed as apertures in at least one of the first and second outer walls 20, 22 so that the coolant can pass through the interior space 62, between the baffles 24, and through the fluid passages 66. The coolant can be any type of coolant known in the art, including water, various heat transfer fluids, solvents, solutions, $CO_2$, ionic fluid, molten salts, or the like.

Figure 3C:
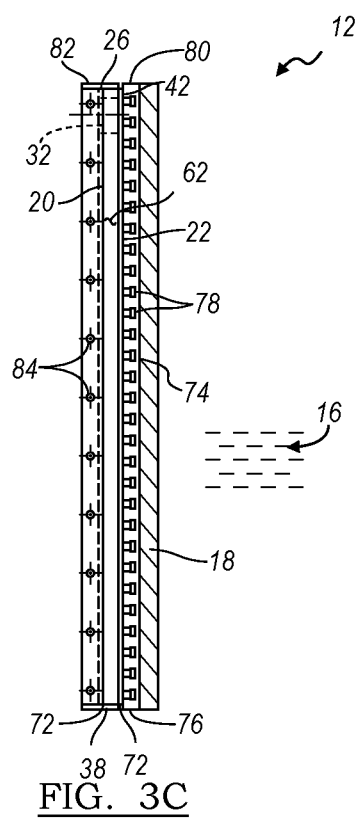
FIG. 3C is a cross-sectional side view of the cooling panel shown in FIGS. 3A and 3B, showing refractory material disposed on one outer wall and a frozen glass layer disposed on the refractory material, in accordance with an illustrative aspect of the present disclosure.

FIG. 3C illustrates a cross-section view along line 3C in FIG. 3B showing a fillet weld 72 between the side walls 34, 36, 38, 40 and the first and second outer walls 20, 22 and showing a refractory material 74 that may be disposed proximate to and/or coupled to an outer wall (e.g., the first outer wall 20). At least one form 76 may be coupled to at least one side wall 34, 36, 38, 40 for assisting in forming the refractory material 74 on the first outer wall 20. The refractory material 74 can be configured to initially contact the molten material 16 in the melter 10. As the refractory material 74 is cooled by the cooling panel 12, a portion of the molten material 16 can become solid and/or at least very viscous and can form a frozen material layer 18 that can be coupled to the refractory material 74. The frozen material layer 18 can protect the refractory material 74 and the cooling panel 12 from the corrosive molten material 16.

In the embodiment shown in FIG. 3C, the cooling panel 12 may include one or more protrusions 78, for example studs having enlarged heads, extending from the first outer wall 20 that are configured to at least partially carry the refractory material 74 that is cast onto the first outer wall 20. In this way, the one or more protrusions 78 can be embedded into the refractory material 74 to assist in holding the refractory material 74 onto the first outer wall 20. It will be appreciated that the one or more protrusions 78 may include a variety of configurations, for example screws, tabs, posts, rivets, slugs, bolts, welds, welded pieces, or other members that can be formed of any suitable material known in the art, including steel, various metals, refractory material, or the like.

Additionally, to assist in holding the refractory material 74 on the first outer wall 20, the first outer wall 20 can include a first outer edge 80 disposed and extending about the perimeter 42 of the first outer wall 20 so that the first outer edge 80 extends about the refractory material 74. By using the one or more protrusions 78 and/or the first outer edge 80, the refractory material 74 can be protected and better secured to the first outer wall 20. One of ordinary skill in the art will understand that, in some instances, the refractory material 74, the one or more protrusions 78, and the first outer edge 80 may also be included in the second outer wall 22. It will be appreciated that the cooling panel 12 may also be formed without any refractory material 74, the protrusions 78, and/or the first outer edge 80.

In FIG. 3C, on the opposite side of the cooling panel 12 from the refractory material 74, the second outer wall 22 is depicted as having a second outer edge 82 extending about the perimeter 26. In an embodiment, the second outer edge 82 may include a flange with a plurality of internal apertures 84 (e.g., equidistantly spaced). The internal apertures 84 can be formed in order to accommodate bolts, screws, fasteners, or the like, that would secure the second outer wall 22 and the second outer edge 82 to adjacent cooling panels 12 and/or other parts of the melter 10. As discussed above, the features of one of the first and second outer walls 20, 22 may be switched or additionally added to the other of the first and second outer walls 20, 22. For example, the second outer edge 82 with the internal apertures 84 could be added to or part of the first outer wall 20 and/or first outer edge 80.

Figure 3D:
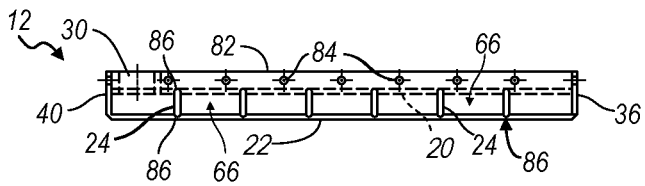
FIG. 3D is a cross-sectional top view of the cooling panel shown in FIGS. 3A through 3C, showing multiple baffles in the interior space of the cooling panel, in accordance with an illustrative aspect of the present disclosure.

FIG. 3D illustrates a cross-section view along line 3D in FIG. 3B showing an embodiment of a plurality of baffles 24 coupled to the first outer wall 20 and the second outer wall 22. Additionally, FIG. 3D shows at least one plug weld 86 between the first and second outer walls 20, 22 and the baffles 24 from the outside of the cooling panel 12. The refractory material 74 and the one or more protrusions 78 have been omitted from the cooling panel 12 shown in FIG. 3D in order to more clearly see the plug weld(s) 86.

In some implementations, the melter 10 and/or one or more cooling panels 12 may include various temperature sensors. For example, one or more temperature sensors can detect the temperature within the portions of the molten material 16, the frozen material layer 18, a surface of a cooling panel 12, and/or temperature of the coolant. In other implementations, the cooling panel 12 does not include any temperature sensors for directly measuring the temperature within the portions of the molten material 16 nor does it include any temperature sensors for directly measuring the temperature of the coolant. In this implementation, various pipes, conduits, or the like (not shown) that can be adjacent to the cooling panel 12 and that route the coolant may include one or more temperature sensors for detecting and/or measuring the coolant temperature. The temperature measurements within the various pipes, conduits, or the like can provide an indirect temperature measurement of the temperature of the coolant when it is in the cooling panel 12. Of course, it will be appreciated that the cooling panel 12 can also be constructed to include various temperature sensors (e.g., a thermocouple) that directly detect and measure, for example, the temperature of the molten material 16, a surface of the molten material 16, the frozen material layer 18, the cooling panel 12, and/or the temperature of the coolant.

The additional embodiments discussed below may be similar in many respects to the embodiments illustrated in FIGS. 3A through 3D, and like numerals (e.g., increased by 100, 200, etc.) among the embodiments generally designate like or corresponding elements throughout the several views of the drawing figures. Accordingly, the descriptions of the embodiments are incorporated into one another, and description of subject matter common to the embodiments generally may not be repeated here.

FIGS. 4A through 4C illustrate an embodiment of a cooling panel 112 that has been fabricated using additive manufacturing. As depicted in FIG. 4A, the first and second outer walls 120, 122, the side walls 134, 136, 138, 140, the baffles 124, the coolant inlet 130, and the coolant outlet 132 can all be part of a single monolithic structure 188 so that there are no welds within the cooling panel 112. As a single monolithic structure, the cooling panel 112 can be formed as part of a material build up process, layer upon layer, and may not have seams, joints, or the like therebetween. Additionally, when implemented as a single monolithic structure, the first and second outer walls 120, 122, the side walls 134, 136, 138, 140, and the baffles 124 do not require external welds. Additive manufacturing may provide a cooling panel 112 with a geometry that may not be possible if other fabrication methods, for example welding, were used.

As shown in FIGS. 4A through 4C, the cooling panel 112 can be additively manufactured so that the first outer wall 120, the second outer wall 122, the side walls 134, 136, 138, 140, and the baffles 124 define multiple fluid passages 166 each having a generally circular cross-section, although it will be appreciated that the cross section of any or each fluid passage 166 may include other configurations and cross-sections (e.g., rectangular, square, and so forth). In the embodiments illustrated in FIGS. 4A through 4C, the cooling panel 112 can include a plurality of fluid passages 166 having circular cross sections and a flow path 160 configured in a serpentine pattern. The fluid passages 166 can be arranged into at least one row 164 parallel to a longitudinal axis A and can have a width W.

In addition to additively manufacturing the first and second outer walls 120, 122, side walls 134, 136, 138, 140, and baffles 124, the single monolithic structure 188 can also include one or more protrusions 178 and/or a first outer edge 180 extending from one of the first and second outer walls 120, 122, as shown in FIG. 4B. The one or more protrusions 178 and/or the first outer edge 180 can be additively manufactured as part of the cooling panel 112. Additionally, a refractory material 174 can either be additively manufactured as part of the single monolithic structure 188 or can be cast onto the single monolithic structure 188. In either case, it is possible to utilize different materials as part of the additive manufacturing process such that the refractory material 174 could be different from the rest of the material included in the single monolithic structure 188 and yet still be part of the single monolithic structure 188. It will be appreciated that it is possible to use various materials within the material build up process (e.g., steel, refractory, and so forth). A second outer edge 182 extending about the perimeter of the other of the first and second outer walls 120, 122 and forming one or more apertures 184 can either be additively manufactured as part of the single monolithic structure 188 or attached as a separate part to the single monolithic structure 188.

FIG. 4C depicts a cross-sectional side view of a specific embodiment of a portion of the cooling panel 112. In this view, the fluid passages 166 are shown as a cross section along the line 4B in FIG. 4A. This specific embodiment illustrates where the fluid passages 166 include an internal feature 190, which can be formed as a part of the single monolithic structure 188. In the embodiment illustrated in FIG. 4B, the internal feature 190 may include a central wall or fin. However, it is contemplated that the internal feature 190 may include other embodiments or configurations. In the embodiment illustrated in FIG. 4C, the internal feature 190 can extend parallel to longitudinal axis A and along the fluid passage 166 within each respective row 164 and can divide each respective fluid passage 166 into multiple portions (e.g., two portions 192, 194). It is contemplated that the internal feature 190 may have a surface that is parallel with respect to the longitudinal axis A, parallel with respect to longitudinal axis B, or positioned at an angle with respect to longitudinal axis A and/or longitudinal axis B. The internal feature 190 can function to enhance heat transfer between the melter 10 and the coolant by providing additional heat transfer surface area and/or by mixing or otherwise altering the flow pattern of the coolant. All or any of the rows 164 or fluid passages 166 may include the internal feature 190. Because the internal feature 190 is part of the single monolithic structure 188, it can provide good heat transfer because its geometry can be engineered and optimized in a way not possible through other manufacturing techniques.

During manufacturing by way of additive manufacturing, three-dimensional printing, rapid prototyping, or a combination thereof, the cooling panel can be formed to include the first and second outer walls 120, 122, side walls 134, 136, 138, 140, and baffles 124, one or more protrusions 178, first and second outer edges 180, 182, refractory material 174, rows 164, and/or internal features 190. In some instances, some of these parts may not be formed as part of the single monolithic structure 188. By additively manufacturing some or all of these parts of the cooling panel 112, they can form intricate passages optimized for heat transfer. For example, the cooling panel 112 can be optimized for conductive heat transfer, or direct transfer of kinetic energy. The cooling panel 112 can also be optimized for convective heat transfer, or indirect fluid transfer as warmer fluid rises and cooler fluid falls in a bulk fluid, and/or to minimize the pressure drop within the cooling panel 112.

Additionally, having a cooling panel 112 comprising a single monolithic structure 188 can allow the various components to withstand greater pressures and use coolants that may not be possible with other manufacturing techniques. Some exemplary coolants that may be used within the cooling panel 112 may include super critical carbon dioxide ($scCO_2$), ionic fluid, molten salts, or the like. Further, the possible intricate geometries can be optimized to reduce any stagnant coolant areas and/or hot spots within the cooling panel 112, for example around the connections and/or turns from one row 164 to the next. The baffles 124 may withstand the internal pressures of the cooling panel 112 better through additive manufacturing as opposed to welding because the maximum internal pressure for welded baffles may depend on the thicknesses of the first and second outer walls and the width between the baffles.

FIGS. 5A-C depict an embodiment of a cooling panel 212 that includes a door 201 and a frame 203 for the door 201 with at least one wall extension 205 configured to provide protection to the refractory material 274 disposed on the door 201, the frame 203, and/or the cooling panel 212. The door 201 and/or the frame 203 may include or at least be a portion of the first outer wall 220 and/or the second outer wall 222 (e.g., flat inner surface) that is internal to the melter 10. When a conventional melter door is opened and detaches from a surrounding frame, refractory material on the door or frame may crack, chip, break, or otherwise become damaged due to the shearing force of opening the door. In order to reduce or eliminate this damage, one or more wall extensions 205 can be formed as a portion of the door 201 and/or frame 203. It will be appreciated that the door 201 and frame 203 may include any other type of opening for the melter 10, including an access point, hatch, or the like.

In the embodiment shown in FIG. 5A, a side view of the cooling panel 212 illustrates the door 201 housed by or disposed within the frame 203, which is further disposed in the cooling panel 212. In some instances, the second outer wall 222 may comprise the frame 203. The door 201 and frame 203 can be manufactured and constructed in accordance with any aspect of the disclosure, including welding, attaching, and/or additive manufacturing. The door 201 and frame 203 can include all or any of the parts discussed herein in the various other aspects of the cooling panel 12, 112, 212. Additionally, at least one coolant inlet 230a, 230b and at least one coolant outlet 232a, 232b may be disposed as a portion of the cooling panel 212 and/or the door 201.

FIG. 5B illustrates a cross section view of the cooling panel 12 along line 5B in FIG. 5A showing the door 201, the frame 203, refractory material 274 disposed on the door 201 and frame 203, protrusions 278, and wall extensions 205 that extend beyond a surface of the first outer wall 220. The wall extensions 205 can include a wall that is integrally formed with and/or coupled to the door 201 and/or the frame 203. Each wall extension 205 can perpendicularly extend beyond a plane of the first outer wall 220 and along a length of the refractory material 274 to protect the refractory material 274 from damage from opening the door 201. The wall extension (s) 205 may extend along at least a portion of a perimeter of the door 201, the frame 203, and/or at least a portion of the refractory material 274. The wall extension 205 can be formed of the same or similar material as the first and/or second outer walls 220, 222 (e.g., steel or the like) and can extend beyond the first outer wall 220 any length desired (e.g., 0.25-2.0 inches). A castable refractory material 274 can be coupled to the first outer wall 220 using, for example, protrusions 178. FIG. 5C illustrates an enlarged view of circle 5C in FIG. 5B.

Each wall extension 205 serves to provide protection to the refractory material 274 when the door 201 is opened. By protecting the refractory material 274, the one or more wall extensions 205 reduce cost and downtime of the melter 10 because repair time of damaged refractory is prevented and/or minimized.

With general reference to FIGS. 3A-5C, the cooling panel 12, 112, 212 can be manufactured such that the rows 64, 164 have a particular geometry that provides optimal pressures and/or flow rates of the coolant. Each row 64, 164 can have a width W between a first baffle 24, 124 and an adjacent baffle 24, 124. Additionally, each baffle 24, 124 can be positioned such that the open transverse surface 58 can be spaced from an adjacent side wall 34, 36, 38, 40 by a distance D. The baffles 24, 124 can alternate such that one baffle 24, 124 has the respective distance D spaced away from a first side wall 34, 38, 134, 138, and an adjacent baffle 24, 124 has the respective distance D spaced away from a second side wall 34, 38, 134, 138 (e.g., distal from the first side wall). The distance D between the side walls 34, 38, 134, 138 can be manufactured such that it is substantially the same between each baffle 24, 124 and each respective side wall 34, 38, 134, 138 so that it is approximately 70% to 80% of the width W of each row 64, 164, including all ranges, subranges, values therebetween, and endpoints. The range of 70% to 80% can be a desirable range for the relationship between the width W and the distance D in order to provide desirable pressures, coolant acceleration from one row 64, 164 to an adjacent row 64, 164, and/or flow rates of the coolant within the cooling panel 12, 112, 212. In contrast, conventional cooling panels may be formed with distance D as 55% to 65% of the width W, including all ranges, subranges, values therebetween, and endpoints.

FIGS. 6A-B depict a cross-section of a specific configuration for a cooling panel 312a, 312b derived from a computer simulation using computational fluid dynamics (CFD) that compares a prior cooling panel configuration to the cooling panels 12, 112, 212 of the present disclosure. For example, FIG. 6A depicts the geometry of a cooling panel 312a having the distance D in the range of 45% to 65% (shown at 55%). The cooling panel 312a can include side walls 334a, 336a, 338a, 340a, coolant inlet 330a, coolant outlet 332a, at least one baffle 324a, and at least one fluid passage 366a. The fluid flow path 360a is depicted by arrows. FIG. 6B depicts the geometry of a cooling panel 312b with the distance D as 75% of the width W (although the range of 70% to 80% can be used, including all ranges, subranges, values therebetween, and endpoints. The cooling panel 312b can include side walls 334b, 336b, 338b, 340b, coolant inlet 330b, coolant outlet 332b, at least one baffle 324b, and at least one fluid passage 366b. The fluid flow path 360b is depicted by arrows.

In addition to the features of any or all of the cooling panel 312b shown, FIG. 6B also depicts that at least some baffles 324b can have a stepped portion 307. The stepped portion 307 may be included in order to accommodate portions of the cooling panel 312b in which the coolant would not flow or flow easily. Each baffle 324b may contain the same length of the stepped portion 307 such that the width W is uniform within the cooling panel 312b. Alternatively, the length of the stepped portion 307 can vary such that the width W is not uniform and varies within the cooling panel 312b. By using the geometry of cooling panel 312b discussed above, hot spots within the cooling panel 312b created by stagnant flow (e.g., proximate to a turn and/or a corner) can be prevented and/or minimized.

Figure 7C:
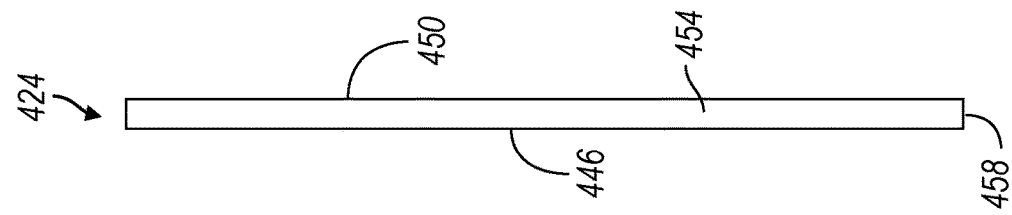
FIG. 7C is a side view of a baffle of the cooling panel included in the melter shown in FIGS. 1A and 1B, where the baffle is configured to be carried by the grooves in FIGS. 7A and 7B, in accordance with an illustrative aspect of the present disclosure.
Figure 7B:
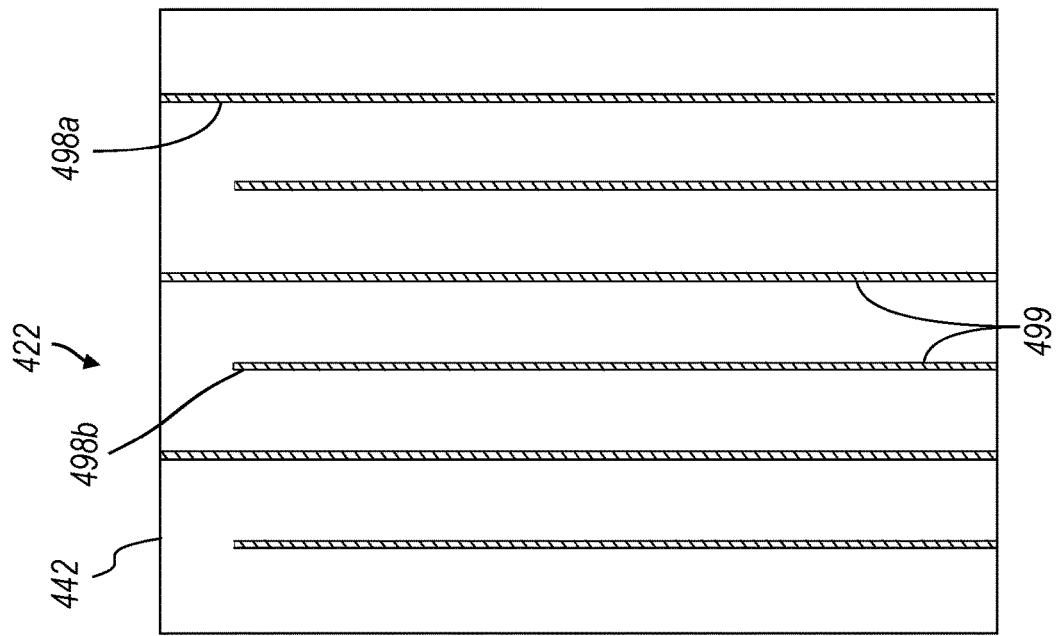
FIG. 7B is a side view of a second outer wall of the cooling panel included in the melter shown in FIGS. 1A and 1B, where the second outer wall includes multiple grooves, in accordance with an illustrative aspect of the present disclosure.
Figure 7A:
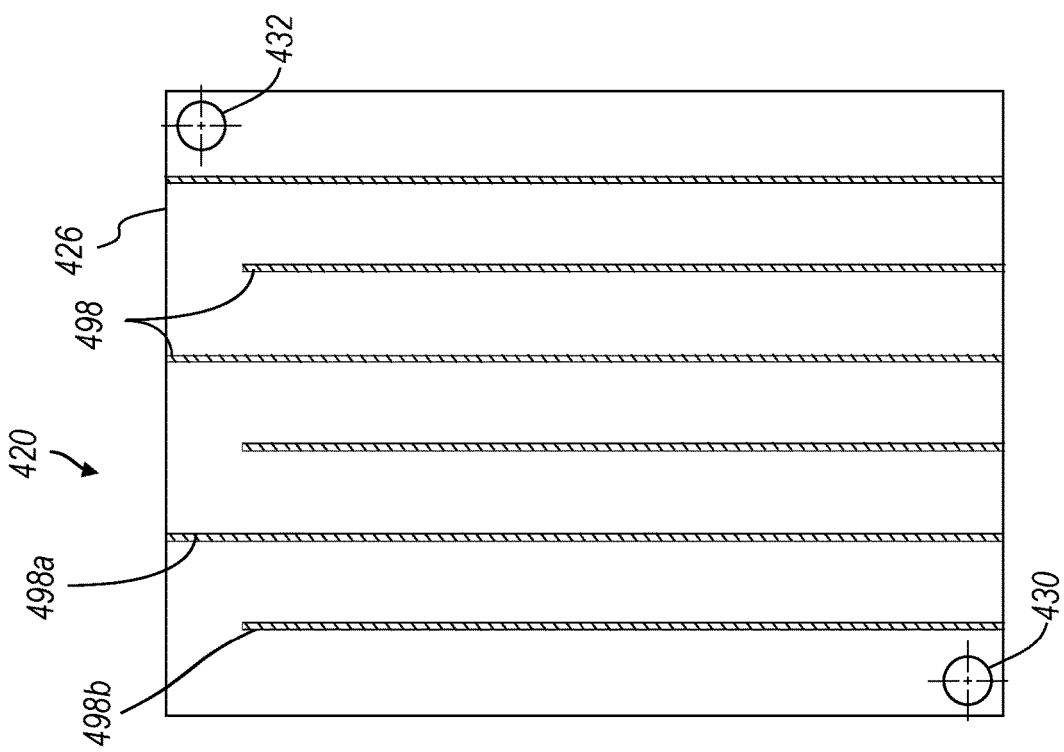
FIG. 7A is a side view of a first outer wall of the cooling panel included in the melter shown in FIGS. 1A and 1B, where the first outer wall includes multiple grooves, in accordance with an illustrative aspect of the present disclosure.

Illustrated in FIGS. 7A through 7C, components of a cooling panel 412 are shown that can include a first outer wall 420, a second outer wall 422, at least one baffle 424, and at least one groove formed in the first outer wall 420 and the second outer wall 422, where the at least one groove is configured to carry the at least one baffle 424.

FIG. 7A illustrates the first outer wall 420, which may further include a coolant inlet 430 and/or a coolant outlet 432. A plurality of side walls 434, 436, 438, 440 can be configured to be coupled (e.g., welded) to the first outer wall 420 around and/or proximate to the perimeter 426. Moreover, the first outer wall 420 can include at least one first groove 498. In the embodiment shown in FIG. 7A, multiple inwardly-facing first grooves 498 can be formed in the first outer wall 420, where the first grooves 498 can be aligned along longitudinal axis A and can be parallel to each other and/or at least some of the side walls (e.g., side walls 436, 440). Some of the first grooves 498 can extend a length of the first outer wall 420, and some of the first grooves 498 can extend only partially the length of the first outer wall 420. In FIG. 7A, the first grooves 498 are shown alternatively between first grooves 498a that extend the full length of the first outer wall 420 and first grooves 498b that extend only partially the length of the first outer wall 420. It will be appreciated that the first grooves 498 may include other configurations.

FIG. 7B illustrates the second outer wall 422 having a perimeter 442 and a plurality of inwardly-facing second grooves 499, which can correspond with the first grooves 498 in a respective first outer wall 420. A set of side walls (e.g., side walls 434, 436, 438, 440) can also be configured to be coupled (e.g., welded or otherwise attached) to the second outer wall 422 around and/or proximate to the perimeter 442.

The second grooves 499 can be formed in the second outer wall 422 and can be aligned along longitudinal axis A and parallel to each other and/or some of the side walls (e.g., side walls 436, 440). Some of the second grooves 499 can extend the length of the second outer wall 422, and some of the second grooves 499 can extend only partially the length of the second outer wall 420. In FIG. 7B, the second grooves 499 are shown alternating between second grooves 499a that extend the full length of the second outer wall 422 and second grooves 499b that extend only partially the length of the second outer wall 422. It will be appreciated that the second grooves 499 may include other configurations.

As illustrated in FIG. 7C, each cooling panel 412 can include at least one baffle 424. Each baffle 424 can have a first side 446 and an opposing second side 450. Also, the at least one baffle 424 can comprise a pair of longitudinal surfaces including a first longitudinal surface 454 and an opposing second longitudinal surface 456. The at least one baffle 424b may also include an open transverse surface 458 configured to not be coupled to anything else (e.g., exposed to coolant). While the open transverse surface 458 in FIG. 7C is shown at the bottom of the baffle 424, it will be appreciated that the open transverse surface 458 could also be located at the top of the baffle 424. The at least one baffle 424 can be configured to be carried by the first grooves 498 and the second grooves 499.

FIGS. 8A-8D illustrate an embodiment of a cooling panel 412 showing a first outer wall 420 and side walls 434, 436, 438, 440 coupled to the first outer wall 420 around a perimeter 426 of the first outer wall 420. The plurality of side walls 434, 436, 438, 440, along with the first outer wall 420 and the second outer wall 422, can define an interior space 462 with fluid passages 466 through which a coolant can flow in a generally serpentine fluid flow path 460. The fluid passages 466 can be aligned and/or correspond with a respective row 464. The baffles 424 can function to divide the interior space 462 into a plurality of rows (e.g., row 464), where each row can be aligned and parallel with a longitudinal axis A and can have a width W. The width W can be between baffles 424 or between a baffle 424 and an adjacent side wall 436, 440. In order to provide a uniform width W for each row 464, the width W between baffles 424 may be the same as the width W between the one baffle 424 and the adjacent side wall 436, 440.

Figure 8A:
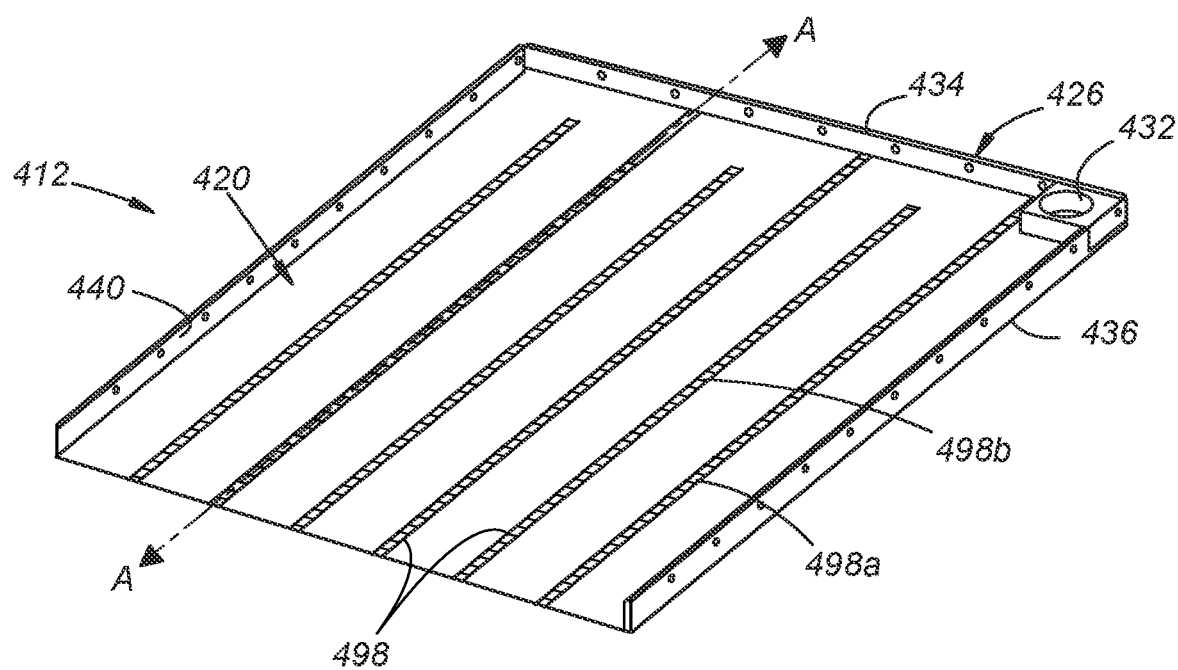
FIG. 8A is an isometric view of the cooling panel included in the melter shown in FIGS. 1A and 1B, illustrated without baffles, with multiple grooves configured to carry the baffles illustrated in FIG. 7C, and with one outer wall removed, in accordance with an illustrative aspect of the present disclosure.

FIG. 8A illustrates an embodiment with the first outer wall 420 including first grooves 498 and side walls 434, 436, 440 coupled to the first outer wall 420. The second outer wall 422 and the baffles 424 are shown removed in FIG. 8A. The baffles 424 may be placed so that they are securely carried by the first grooves 498, which, in some instances, may include using welding or an interference fit.

FIG. 8B illustrates a plurality of baffles 424 coupled to the second outer wall 422, and securely carried by the first grooves 498. The second outer wall 420 is shown removed in FIG. 8B. The first grooves 498 shown in the second outer wall 422 correspond to and are configured to carry respective baffles 424 so that the connections between the first outer wall 420, the second outer wall 422, and the side walls 434, 436, 438, 440 are at least substantially water tight. It will be appreciated that the outer wall shown in FIGS. 3A through 3D may be either the first outer wall 420 and/or the second outer wall 422.

In manufacturing and/or construction of the cooling panel 412, the cooling panel 412 can be formed so that the first grooves 498 and the second grooves 499 are configured to correspond with and carry the baffles 424, respectively, in order to secure the first and second outer walls 420, 422 to the baffles 424. In some implementations, the baffles 424 may be placed before the second outer wall 422 is coupled to the side walls 434, 436, 438, 440. In other implementations, the first outer wall 420 and the second outer wall 422 may be coupled to the side walls (e.g., side walls 434, 436, 440) and one side wall (e.g., side wall 438) may not yet be coupled to the first outer wall 420 and the second outer wall 422. In this implementation, the baffles 424 may be positioned between the first outer wall 420 and the second outer wall 422 by inserting each baffle 424 into the side of the cooling panel 412 where the side wall 438 is not yet coupled. The baffles 424 can be inserted or slid into a respective first groove 498 and a corresponding second groove 499 until the baffle 424 reaches the end of the respective first groove 498 and second groove 499 and/or the side wall 434. The side wall (e.g., side wall 438) may then be coupled to the first outer wall 420, the second outer wall 422, and side walls 436, 440, and the baffles 424 can form the serpentine fluid flow path 460. It will be appreciated that other arrangements and fluid flow paths may be implemented other than a serpentine-type configuration. The cooling panel 412 may also include the coolant inlet 430 and the coolant outlet 432 for passing a coolant into and from the cooling panel 412.

FIG. 8C illustrates a cross-section view along line 8C in FIG. 8B showing the first outer wall 420 and the second outer wall 422 coupled to the side walls 434, 436, 438, 440 and showing a refractory material 474 configured to initially contact molten material 16 in the melter 10, upon which a portion of the molten material 16 can become solid and/or at least very viscous and can form a frozen material layer 18 on the refractory material 474. Additionally, as shown in FIG. 3C, the cooling panel 412 may include one or more protrusions 478, a first outer edge 480, and/or a second outer edge 482 including a flange with a plurality of internal apertures 484 (e.g., equidistantly spaced). As discussed above, the features of one of the first and second outer walls 420, 422 may be switched or additionally added to the other of the first and second outer walls 420, 422.

FIG. 8D illustrates a cross-section view along line 8D in FIG. 8B showing an embodiment of the cooling panel 412 with a plurality of baffles 424 coupled to the first outer wall 420 and the second outer wall 422 and disposed in and carried by the first grooves 498 and the second grooves 499. The refractory material 474 and the one or more protrusions 478 have been omitted from the cooling panel 412 shown in FIG. 8D.

FIG. 9 illustrates an example of a method 500 for manufacturing and/or fabricating a cooling panel 12. For purposes of illustration and clarity, method 500 will be described in the context of the melter 10 and cooling panels 12, 112, 212, 312, 412 described above and generally illustrated in FIGS. 1A through 8D. It will be appreciated, however, that the application of the present methodology is not meant to be limited solely to such an arrangement, but rather method 500 may find application with any number of arrangements.

Method 500 can include a step 502 of receiving a plurality of side walls 34, 36, 38, 40, first and second outer walls 20, 22 each having a plurality of first and second openings 28, 44, respectively, and a plurality of baffles 24 each having a plurality of projections 48, 52. Second, the method 400 can include a step 504 of connecting the first and second openings 28, 44 and projections 48, 52 together, respectively, from outside of the cooling panel 12 so that the baffles 24 are disposed between the first and second outer walls 20, 22. Subsequently, the method 500 can include a step 506 of connecting the side walls 34, 36, 38, 40 to the first and second outer walls 20, 22 so that the cooling panel 12 is fluid-tight. This method may not include forming any interior welds within the cooling panel 12, and especially not before the step of connecting the first and second openings 28, 44 and projections 48, 52 together.

More specifically, the method 500 can include the first and second openings 28, 44 including slots, and the projections 48, 52 including tabs, so that a plurality of first projections 48 extend from the first side 46 of each baffle 24 to fit in the openings 28 of the first outer wall 20 and so that a plurality of projections 52 extend from the second side 50 of each baffle 24 to fit in the openings 44 of the second outer wall 22. Subsequently, the first and second openings 28, 44 and the respective projections 48, 52 can be plug welded together, respectively, from outside of the cooling panel 12. Further, the side walls 34, 36, 38, 40 can be fillet welded to both of the first and second outer walls 20, 22, also from outside the cooling panel 12.

Next, the method 500 may include a step 508 of attaching the coolant inlet and outlet 30, 32 to one of the first and/or second outer walls 20, 22 so that the coolant inlet 30 is attached to the bottom portion 68 of the cooling panel 12, and the coolant outlet 32 is attached to the top portion 70 of the cooling panel 12. By attaching the coolant inlet 30 to the bottom portion 68 (e.g., a bottom corner), the coolant can be fed into the bottom portion 68 and forced or pumped upwards within the cooling panel 12 and through the fluid flow path 60 so that it exits at the top portion 70 (e.g., a top corner). This flow pattern can reduce the risk of developing an air pocket at the top portion 70, which otherwise might occur if the coolant started at the top portion 70 and flowed downward by way of gravity and/or pumping. Such an air pocket can expand over time and eventually cause the cooling panel 12 to operate inefficiently, develop cracks or breaks, and/or otherwise require repair or replacement. Reducing the risk of developing an air pocket can also reduce the pressure drop of the coolant within the cooling panel 12 and assist in a more uniform and continuous coolant flow rate.

The method 500 may include a step 510 of forming the one or more protrusions 78 on one of the first and second outer walls 20, 22 (e.g., the second outer wall 22). The method 500 may also include a step 512 of disposing and/or casting the refractory material 74 onto the one or more protrusions 78 so that the one or more protrusions 78 are embedded into the refractory material 74. As discussed above, the one or more protrusions 78 can assist in holding the refractory material 74 to the one of the first and second outer walls 20, 22 and/or in protecting the refractory material 74 from cracking, chipping, breaking, or otherwise becoming damaged during use of the melter 10.

Optionally, the method 500 may include the step 514 of attaching one or more forms 96 to at least one side wall 28, 30, 32, 34 of the cooling panel 12 to assist in disposing the refractory material 74 on to one of the first and second outer walls 20, 22. Once the one or more forms 96 are attached to the respective side walls, the method 500 may include the step 512 of disposing and/or casting the refractory material 74 onto the one or more protrusions 78 so that the one or more protrusions 78 are embedded into the refractory material 74. After the refractory material 74 is solidified or otherwise set, the method 500 may further include the step 516 of removing the one or more forms 96 from the at least one side wall 28, 30, 32, 34 of the cooling panel 12. In this way, the forms 96 are not a permanent part of the cooling panel 12, but rather part of an intermediate structure of the cooling panel 12, and simply assist in its construction. The optional first and second outer edges 80, 82 can also be attached as part of the construction, having any or all of the features discussed herein.

As shown in FIG. 10, another method 600 of manufacturing and constructing the cooling panel 112 can include additive manufacturing or a similar process. Additive manufacturing can include a process by which three-dimensional structures are created, typically layer upon layer, to build up material to a desired geometry. For example, a step 602 can include forming the cooling panel 112 using additive manufacturing, three-dimensional printing, rapid prototyping, or a combination thereof.

Because the desired geometry is created through this build up process, it is possible to create three dimensional structures having geometries that are not feasible and/or otherwise possible through other types of manufacturing, including welding various parts together, for example the cooling panel 112 illustrated in FIGS. 4A through 4C. The final geometry created can be a single monolithic structure that does not include any welds, seams, or other joint areas between parts. Some examples of additive manufacturing include three dimensional (3D) printing, rapid prototyping, powder bed fusion, sheet lamination, directed energy deposition, or a combination thereof. It will be appreciated that the final geometry can include various parts that are not additively manufactured and/or are not part of the single monolithic structure. These parts can be formed using traditional manufacturing techniques, such as cutting and/or welding, while other parts are additively manufactured using the material build up process.

It will be appreciated that the cooling panel 12, 112, 212, 312, 412 can be included in any part of the melter 10, and there can be as many cooling panels 12, 112, 212, 312, 412 as desired. In one aspect, the melter 10 includes ten cooling panels 12, 112, 212, 312, 412 that are identical. Having multiple identical cooling panels 12, 112, 212, 312, 412 allows the advantage of easier manufacturing of at least a portion of the cooling panels 12, 112, 212, 312, 412 within the melter 10. It will be appreciated that all cooling panels 12, 112, 212, 312, 412 in the melter 10 could be identical to each other. Additionally, the melter 10 can also include more cooling panels 12, 112, 212, 312, 412 that are similar, but not identical, to each other. In one aspect, the melter 10 includes fourteen cooling panels 12, 112, 212, 312, 412 in addition to the ten identical cooling panels 12, 112, 212, 312, 412 that are in accordance with various aspects of this disclosure; however, each of the fourteen cooling panels 12, 112, 212, 312, 412 are unique to any other cooling panels 12, 112, 212, 312, 412 within the melter 10 in some way. It will be appreciated that all cooling panels 12, 112, 212, 312, 412 in the melter 10 could be similar, but not identical, to each other.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The drawings are not necessarily shown to scale. The disclosure is intended to embrace all such modifications and variations as fall within the spirit and broad scope of the appended claims.

The invention claimed is:

1. A cooling panel for a melter, comprising:
   first and second outer walls and a plurality of side walls coupled to the first and second outer walls, defining an interior space, where each of the first and second outer walls has a plurality of openings; and
   a plurality of baffles disposed in the interior space, where the baffles include a plurality of projections;
   wherein respective openings and projections fit together and are connected from outside of the cooling panel so that the outer walls and the baffles are fixed together, and the side walls are fixed to the outer walls so that the cooling panel is fluid-tight.

2. The cooling panel of claim 1, wherein the cooling panel does not include interior welds inside the cooling panel.

3. The cooling panel of claim 1, wherein at least one of the baffles has a first side and a second side, and the respective projections for each baffle extend from both of the first and second sides so that a plurality of first projections extend from the first side to fit in respective first openings of the plurality of openings of the first outer wall, and a plurality of second projections extend from the second side to fit in respective second openings of the plurality of openings of the second outer wall.

4. The cooling panel of claim 1, wherein the side walls, outer walls, and baffles form a serpentine flow path for passing a coolant within the interior space.

5. The cooling panel of claim 1, wherein the cooling panel has a bottom portion and a top portion and includes a coolant inlet at the bottom portion and a coolant outlet at the top portion for passing a coolant.

6. The cooling panel of claim 1, wherein the cooling panel does not include a temperature sensor.

7. The cooling panel of claim 1, further comprising refractory material and one or more protrusions extending from one of the first and second outer walls so that the one or more protrusions are embedded into the refractory material.

8. The cooling panel of claim 7, further comprising a first outer edge extending about a perimeter of one of the first and second outer walls so that the first outer edge extends about the refractory material.

9. The cooling panel of claim 8, further comprising a second outer edge extending about a perimeter of the other of the first and second outer walls wherein the second outer edge forms one or more internal apertures.

10. The cooling panel of claim 1, wherein the plurality of baffles divides the interior space into a plurality of rows.

11. The cooling panel of claim 1, further comprising refractory material extending from the second outer wall, and wherein the cooling panel includes a door and a frame for the door.

12. The cooling panel of claim 11, further comprising one or more wall extensions extending from at least one of the door or frame beyond the second outer wall and at least partially surrounding a portion of the refractory material.

13. The cooling panel of claim 1, wherein the side walls are fillet welded to both of the first and second outer walls.

14. The cooling panel of claim 1, wherein the projections of the baffles are welded from outside of the cooling panel.

15. The cooling panel of claim 14, wherein the projections of the baffles are plug welded.

16. The cooling panel of claim 1, wherein at least some of the baffles have lengths shorter than that of the first and second outer walls.

17. The cooling panel of claim 1, further comprising one or more protrusions on one of the first and second outer wall, wherein the protrusions include studs extending away from the first or second outer wall.

18. A cooling panel for a melter, comprising:
   a first outer wall having a first interior surface, a first exterior surface, and first openings extending through the first outer wall between the first interior and exterior surfaces;
   a second outer wall having a second interior surface facing the first interior surface of the first outer wall, a second exterior surface, and second openings extending through the second outer wall between the second interior and exterior surfaces;
   a plurality of side walls welded to the first and second outer walls and, together with the first and second outer walls, defining an interior space of the cooling panel; and
   a plurality of baffles disposed in the interior space, wherein at least one of the plurality of baffles has a first side and a second side, and projections extending from the first and second sides so that a plurality of first projections extend from the first side to fit in the first openings of the first outer wall, and a plurality of second projections extend from the second side to fit in the second openings of the second outer wall, and wherein the baffles are welded to the first and second outer walls from outside of the cooling panel at the projections.

19. The cooling panel of claim 18, wherein the cooling panel does not include interior welds connecting the baffles to the outer walls.

20. The cooling panel of claim 18, further comprising:
   a refractory material carried by the first outer wall;
   a first outer edge extending about a perimeter of the first outer wall so that the first outer edge extends about the refractory material; and
   a second outer edge extending about a perimeter of the second outer wall, wherein the second outer edge includes one or more apertures.

* * * * *